US009116608B2

(12) United States Patent
Koo et al.

(10) Patent No.: US 9,116,608 B2
(45) Date of Patent: Aug. 25, 2015

(54) ACTIVATION OF DORMANT FEATURES IN NATIVE APPLICATIONS

(71) Applicant: Tealium Inc., San Diego, CA (US)

(72) Inventors: Jason Lap-Wing Koo, San Diego, CA (US); Charles Scott Glommen, Oceanside, CA (US)

(73) Assignee: TEALIUM INC., San Diego, CA (US)

( * ) Notice: Subject to any disclaimer, the term of this patent is extended or adjusted under 35 U.S.C. 154(b) by 0 days.

(21) Appl. No.: 14/492,583

(22) Filed: Sep. 22, 2014

(65) Prior Publication Data

US 2015/0143244 A1 May 21, 2015

Related U.S. Application Data

(63) Continuation of application No. 14/159,062, filed on Jan. 20, 2014, now Pat. No. 8,843,827.

(60) Provisional application No. 61/755,362, filed on Jan. 22, 2013, provisional application No. 61/872,530, filed on Aug. 30, 2013.

(51) Int. Cl.
*G06F 3/0484* (2013.01)
*H04W 4/20* (2009.01)
(Continued)

(52) U.S. Cl.
CPC .......... *G06F 3/04842* (2013.01); *G06F 3/0484* (2013.01); *H04L 41/0803* (2013.01); *H04L 41/22* (2013.01); *H04W 4/206* (2013.01); *H04W 4/028* (2013.01)

(58) Field of Classification Search
CPC ........................ G06F 3/04842; H04L 41/0803
USPC .......................................................... 715/736
See application file for complete search history.

(56) References Cited

U.S. PATENT DOCUMENTS

| 6,836,799 B1 | 12/2004 | Philyaw et al. |
| 7,685,168 B2 | 3/2010 | Koinuma et al. |

(Continued)

FOREIGN PATENT DOCUMENTS

| CN | 102693501 A | 9/2012 |
| WO | WO 2009/009109 | 1/2009 |

(Continued)

OTHER PUBLICATIONS

"Preload CSS/JavaScript without execution," http://www.phpied.com/preload-cssjavascript-without-execution, Apr. 21, 2010, in 14 pages.

(Continued)

*Primary Examiner* — Andrea Leggett
(74) *Attorney, Agent, or Firm* — Knobbe, Martens, Olson & Bear LLP

(57) ABSTRACT

A native application can be deployed that obtains configuration information for the native application at run-time. Digital marketing users or other marketing users can view or control the behavior of the native application by displaying or setting the configuration information of the native application. The native application can report tracked end user interactions and events with the native application according to the configuration information to tag management systems for data compilation by the tag management systems. In addition, the native application can enable digital marketing users or other marketing users to view or control the behavior of the native application from within the native application using an integrated configuration utility. The configuration utility can be activated using a two-stage activation process or an activation and authorization process to prevent an end user from accidentally encountering the configuration utility during routine use of the native application.

20 Claims, 12 Drawing Sheets

(51) Int. Cl.
*H04L 12/24* (2006.01)
*H04W 4/02* (2009.01)

(56) References Cited

U.S. PATENT DOCUMENTS

| | | | |
|---|---|---|---|
| 7,685,200 | B2 | 3/2010 | Gunawardena et al. |
| 7,805,670 | B2 | 9/2010 | Lipton et al. |
| 7,823,059 | B2 | 10/2010 | Hodgkinson |
| 7,890,461 | B2 | 2/2011 | Oeda et al. |
| 7,908,336 | B2 | 3/2011 | Carlson et al. |
| 7,992,135 | B1 | 8/2011 | Wong et al. |
| 8,131,861 | B2 | 3/2012 | Butler et al. |
| 8,316,188 | B2 | 11/2012 | Kadambi et al. |
| 8,407,321 | B2 | 3/2013 | Mickens et al. |
| 8,429,243 | B1 | 4/2013 | Wang et al. |
| 8,539,345 | B2 | 9/2013 | Appleyard et al. |
| 8,560,610 | B2 | 10/2013 | Lunt et al. |
| 2002/0083167 | A1 | 6/2002 | Costigan et al. |
| 2003/0001888 | A1 | 1/2003 | Power |
| 2003/0184452 | A1 | 10/2003 | Goodgoll |
| 2004/0054784 | A1 | 3/2004 | Busch et al. |
| 2004/0083259 | A1 | 4/2004 | Tenembaum |
| 2004/0123044 | A1 | 6/2004 | Franaszek |
| 2005/0125290 | A1 | 6/2005 | Beyda et al. |
| 2005/0138143 | A1 | 6/2005 | Thompson |
| 2005/0154781 | A1 | 7/2005 | Carlson et al. |
| 2005/0165643 | A1 | 7/2005 | Wilson et al. |
| 2006/0031778 | A1 | 2/2006 | Goodwin et al. |
| 2006/0271669 | A1 | 11/2006 | Bouguenon et al. |
| 2007/0250618 | A1 | 10/2007 | Hammond |
| 2008/0046562 | A1 | 2/2008 | Butler |
| 2008/0077561 | A1 | 3/2008 | Yomtobian |
| 2008/0244051 | A1 | 10/2008 | Morris |
| 2009/0006945 | A1 | 1/2009 | Gumz et al. |
| 2009/0248494 | A1 | 10/2009 | Hueter et al. |
| 2009/0293001 | A1 | 11/2009 | Lu et al. |
| 2010/0179967 | A1 | 7/2010 | Zhang et al. |
| 2010/0228850 | A1 | 9/2010 | Fomitchev |
| 2010/0251128 | A1 | 9/2010 | Cordasco |
| 2010/0281008 | A1 | 11/2010 | Braunwarth |
| 2010/0318976 | A1 | 12/2010 | Everly et al. |
| 2011/0015981 | A1 | 1/2011 | Subramanian |
| 2011/0055710 | A1 | 3/2011 | Kirkby et al. |
| 2011/0082858 | A1 | 4/2011 | Yu et al. |
| 2011/0093461 | A1 | 4/2011 | Mui et al. |
| 2011/0119374 | A1 | 5/2011 | Ruhl et al. |
| 2011/0153422 | A1 | 6/2011 | Cousins |
| 2011/0153796 | A1 | 6/2011 | Branson |
| 2011/0167391 | A1* | 7/2011 | Momeyer et al. ............ 715/863 |
| 2011/0185016 | A1 | 7/2011 | Kandasamy et al. |
| 2011/0219115 | A1 | 9/2011 | Capel et al. |
| 2011/0246879 | A1 | 10/2011 | White et al. |
| 2011/0282739 | A1 | 11/2011 | Mashinsky et al. |
| 2011/0296322 | A1* | 12/2011 | Dhanjal et al. ............... 715/760 |
| 2011/0302306 | A1 | 12/2011 | Hanson et al. |
| 2011/0314092 | A1 | 12/2011 | Lunt et al. |
| 2012/0005257 | A1 | 1/2012 | Narayanana et al. |
| 2012/0016836 | A1 | 1/2012 | Fender et al. |
| 2012/0054596 | A1 | 3/2012 | Kroger et al. |
| 2012/0124131 | A1 | 5/2012 | Muret et al. |
| 2012/0154292 | A1 | 6/2012 | Zhao et al. |
| 2012/0169624 | A1 | 7/2012 | Garn et al. |
| 2012/0221411 | A1 | 8/2012 | Graham, Jr. |
| 2013/0073401 | A1 | 3/2013 | Cook |
| 2013/0086484 | A1 | 4/2013 | Antin et al. |
| 2013/0091025 | A1 | 4/2013 | Farahat et al. |
| 2013/0124332 | A1 | 5/2013 | Doughty et al. |
| 2013/0191208 | A1 | 7/2013 | Chourey et al. |
| 2013/0282898 | A1 | 10/2013 | Kalus et al. |
| 2013/0290480 | A1 | 10/2013 | Manion et al. |
| 2013/0332604 | A1 | 12/2013 | Seth et al. |
| 2014/0013203 | A1 | 1/2014 | Rogoveanu |
| 2014/0081981 | A1 | 3/2014 | Morris |
| 2014/0215050 | A1 | 7/2014 | Lu |

FOREIGN PATENT DOCUMENTS

| | | |
|---|---|---|
| WO | WO 2011/128924 | 10/2011 |
| WO | WO 2013/003302 | 1/2013 |

OTHER PUBLICATIONS

"What are the ways to load JavaScript or CSS without executing them?" http://stackoverflow.com/questions/8843132/what-are-the-ways-to-load-javascript-or-css-without-executing-them, Jan. 12, 2012, in 4 pages.

"Separating JavaScript Download and Execution," http://www.nczonline.net/blog/2011/02/14/separating-javascript-download-and-execution, Feb. 14, 2014, in 7 pages.

International Search Report and Written Opinion issued in International Application No. PCT/US2014/052774 mailed on Dec. 29, 2014, in 23 pages.

International Search Report and Written Opinion issued in International Application No. PCT/US2014/052766 mailed on Dec. 8, 2014, in 11 pages.

International Search Report and Written Opinion issued in International Application No. PCT/US2014/063927 mailed on Jan. 29, 2015, in 11 pages.

U.S. Appl. No. 14/149,717, filed Jan. 7, 2014, Glommen, et al.
U.S. Appl. No. 14/151,700, filed Jan. 9, 2014, Anderson, et al.
U.S. Appl. No. 14/216,801, filed Mar. 17, 2014, Glommen.

Behnam, Ali, "Taking Your Test Platform to the Next Level", http://tealium.com/blog/digital-marketing/taking-your-test-platform-to-the-next-level/, retrieved Jan. 12, 2014, in 10 pages.

Handwrite on mobile, Google, https://support.google.com/websearch/answer/2649515?p=sbw_tips&hl=en&rd=2, retrieved Jan. 12, 2014, in 3 pages.

Access your campaign report in Google Analytics, http://help.campaignmonitor.com/topic.aspx?t=112, retrieved on Feb. 10, 2014, in 5 pages.

Adobe Analytics/Tag management, http://www.adobe.com/in/solutions/digital-analytics/tag-management.html retrieved on Feb. 10, 2014, in 1 page.

"Boosting Marketing Agility with Enterprise Tag & Data Management", Ensighten, dated Jun. 2013, in 14 pages.

eVisit Analyst 8 Features, http://www.evisitanalyst.com/eva8, retrieved on Feb. 10, 2014, in 6 pages.

Improving Testing & Optimization Through Tag Management—Key Factors to Consider When Choosing the Right Tag Management Solution, Tealium, dated Sep. 2013, in 12 pages.

Padolsey, James, "Avoiding DOM Flickering", published: Jul. 23, 2009, pp. 1-6, http://james.padolsey.com/javascript/avoiding-dom-flickering/.

"Site Tagging Best Practices Version 1.0 Draft Public Comment", iab (Interactive Advertising Bureau), dated Nov. 29, 2012, in 18 pages.

"TagMan and Digital Fulcrum Join Forces to Optimize Performance of Legacy 3rd Party Tags", http://www.tagman.com/tagman-and-digital-fulcrum-join-forces-to-optimize-performance-of-legacy-3rd-party-tags/ New York, NY, dated Feb. 9, 2012, in 3 pages.

Website: 'TheScarms', "ASP.net V2.0 Client-Side JavaScript Callbacks (AJAX)", published: Jul. 18, 2007, pp. 1-4, https://web.archive.org/web/20070718054551/http://www.thescarms.com/dotnet/ajax.aspx.

West, "Tag management Systems: How do I choose?" Demystified, Jul. 29, 2013, in 5 pages.

International Search Report and Written Opinion issued in International Application No. PCT/US2014/012217 mailed on May 21, 2014, in 11 pages.

* cited by examiner

FIG. 11

ACTIVATION OF DORMANT FEATURES IN NATIVE APPLICATIONS

RELATED APPLICATIONS

This application is a continuation of U.S. patent application Ser. No. 14/159,062, filed Jan. 20, 2014, entitled "ACTIVATION OF DORMANT FEATURES IN NATIVE APPLICATIONS," which claims priority under 35 U.S.C. §119(e) as a nonprovisional application of the following U.S. Provisional Applications:

| App. No. | Filing Date | Title | Attorney Docket |
|---|---|---|---|
| 61/872530 | Aug. 30, 2013 | CONTENT SITE VISITOR PROCESSING SYSTEM | TEALM.001PR |
| 61/755362 | Jan. 22, 2013 | SYSTEMS AND METHODS FOR PROVIDING TAG MANAGEMENT FOR PORTABLE DEVICES | TEALM.006PR |

In addition, this application is related to U.S. application Ser. No. 14/149,717, filed Jan. 7, 2014, titled "Content Site Visitor Processing System" and U.S. application Ser. No. 14/151,700, filed Jan. 9, 2014, titled "Combined Synchronous and Asynchronous Tag Deployment." The disclosures of each of the foregoing applications are hereby incorporated by reference in their entirety. Further, any subset of the embodiments described herein can be implemented in combination with any subset of the embodiments described in the foregoing applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some operators of content sites, such as websites, regularly obtain the results of analytics performed with regard to user interactions on their content sites. User analytics can include any type of data regarding interactions of end users with content sites, among other types of data. There are different approaches to gathering analytics data, one of which includes employing the use of tags.

Tags can include small pieces of website code that allow a website operator to measure traffic and visitor behavior, understand the impact of online advertising and social channels, use remarketing and audience targeting, or test and improve a content site, among optionally other functions. Adding tags to a content site has typically required involving a developer to manually insert tag code into one or more pages of a website.

SUMMARY

In one embodiment, a method of presenting information about elements of a host application is disclosed. The method can be performed under control of a physical computing device including digital logic circuitry. The method can include: executing a host application; receiving a first user input indicative of a user shaking the physical computing device; in response to determining that the first user input matches a first activation input, executing a confirmation routine to process one or more additional user inputs to the physical computing device; receiving a second user input with the confirmation routine after said receiving the first user input, the second user input indicative of the user contacting a screen of the physical computing device; and in response to determining, using the confirmation routine, that the second user input matches a second activation input, displaying a configuration utility on the screen, the configuration utility configured to output information regarding trackable elements of the host application.

The method of the preceding paragraph can further include one or more of the following features: The method can include (i) receiving a third user input indicative of selection of an interactive user interface element of the trackable elements of the host application after said receiving the second user input, the third user input indicative of the user contacting the screen, (ii) in response to determining that the third user input matches a configuration selection input, processing the third user input using the configuration utility to output a tracking identifier associated with the interactive user interface element, and (iii) in response to determining that the third user input does not match the configuration selection input, navigating within the host application based at least on the interactive user interface element. The configuration utility can be configured for use by an administrator of the host application and not for use by an end user of the host application. The method can include, in response to determining that the second user input has not been received within a timeout period, stopping said executing the confirmation routine. The physical computing device can include a mobile phone or a tablet computer, and the host application can include the confirmation routine and the configuration utility.

In one embodiment, non-transitory physical computer storage including computer-executable instructions stored thereon is disclosed. The computer-executable instructions, when executed by one or more processors, can implement a process. The process can include: receiving configuration information for configuring a physical computing device; receiving a first user input from a user of the physical computing device, the first user input comprising a motion component; in response to determining that the first user input matches a first activation input, listening for a second user input to the physical computing device using confirmation instructions of the computer-executable instructions; receiving the second user input from the user; and in response to determining, using the confirmation instructions, that the second user input matches a second activation input, displaying a configuration utility interface on a display of the physical computing device, the configuration utility interface configured to display information indicative of the configuration information.

The computer-executable instructions of the preceding paragraph, when executed by one or more processors, can further implement a process that includes one or more of the following features: The first activation input can be different from the second activation input. The process can include (i) receiving a third user input from the user, the third user input indicative of selection of an element of a user interface displayed on the display, (ii) in response to determining that the third user input matches a configuration selection input, displaying information corresponding to the third user input in the configuration utility interface, the configuration utility interface shown in juxtaposition to the user interface on the display, and (iii) in response to determining that the third user input does not match the configuration selection input, displaying information corresponding to the third user input in the user interface. The process can include, in response to determining that the second user input has not been received within a timeout period, stopping said listening for the second input to the physical computing device using the confirmation instructions. The configuration information can denote elements of a user interface to be tracked as the user interacts with the user interface. The process can include transmitting, to a tracking server, data indicative of interactions of the user with the elements of the user interface denoted by the configuration information. The elements of the user interface denoted by the configuration information can include links displayed in the user interface. The configuration utility interface can be configured to display whether elements of a user interface are trackable as the user interacts with the user interface. The configuration utility interface can be usable by the user to change the configuration information stored on the configuration information server when the user may be an authenticated user. The second user input can be an input indicative of consecutive taps on the display by the user. The computer-executable instructions can include user interface instructions for displaying a user interface and configuration utility instructions for displaying the configuration utility interface, the confirmation and configuration utility instructions including third-party developed computer-executable instructions, the user interface instructions including first-party developed computer-executable instructions. The configuration utility interface can be configured for use by an administrator of the computer-executable instructions, and the user interface can be configured for use by an end user of the computer-executable instructions.

In one embodiment, a system for presenting information regarding elements of a host application is disclosed. The system can include a memory and a processor. The memory can be configured to store a host application, and the hardware processor can be configured to communicate with the memory. The hardware processor configured to: execute the host application; listen for a motion input; in response to determining that the motion input matches an expected motion input, listen for a user input received before an end of a timeout period; and in response to determining that the user input matches an activation input, invoke an operation module. The expected motion input can be different from the activation input.

The system of the preceding paragraph can further include one or more of the following features: The processor can be configured to: in response to determining that a second user input matches a configuration selection input, process the second user input using the configuration utility; and in response to determining that the second user input does not match the configuration selection input, not process the second user input using the configuration utility. The determination of whether the motion input matches the expected motion input and the determination of whether the user input matches the activation input are configured to provide a confirmation that a user intends to activate the configuration utility so that an end user of the host application does not accidentally encounter the configuration utility during routine use of the host application.

In one embodiment, a system for providing access to a tag management application is disclosed. The system can include a mobile device. The mobile device can include a processor and a memory device. The memory device can be configured to store at least a tag management application and a gesture-to-display module. The gesture-to-display module configured, when executed by the processor, to: listen for a shake gesture corresponding to a user shaking the mobile device; in responsive to identifying the shake gesture, determine whether a predetermined interaction with the mobile device has occurred; and in response to determining that the predetermined interaction with the mobile device has occurred, invoke the tag management application.

The system of the preceding paragraph can further include one or more of the following features: The gesture-to-display module can be configured to listen for the shake gesture by hooking into a gesture application programming interface (API) of a host application stored in the memory. The gesture-to-display module can be configured to output an invisible overlay over a host application interface. The gesture-to-display module can be configured to detect screen activity via the invisible overlay to determine whether the predetermined interaction with the mobile device has occurred. The predetermined interaction can include one or both of taps and swipes. The gesture-to-display module can be configured to determine whether a predetermined interaction with the mobile device has occurred by activating a voice detection module of the mobile device to listen for a voice command In one embodiment, a system including a processor and a memory device is disclosed. The memory device can be configured to store at least a first application and a gesture-to-display module. The gesture-to-display module configured, when executed by the processor, to: listen for a shake gesture corresponding to a user shaking the mobile device; in responsive to identifying the shake gesture, determine whether a predetermined interaction with the mobile device has occurred; and in response to determining that the predetermined interaction with the mobile device has occurred, invoke the first application.

The system of the preceding paragraph can further include one or more of the following features: The gesture-to-display module can be configured to listen for the shake gesture by hooking into a gesture application programming interface (API) of a host application stored in the memory. The gesture-to-display module can be configured to output an invisible overlay over a host application interface. The gesture-to-display module can be configured to detect screen activity via the invisible overlay to determine whether the predetermined interaction with the mobile device has occurred. The predetermined interaction can include one or both of taps and swipes. The gesture-to-display module can be configured to determine whether a predetermined interaction with the mobile device has occurred by activating a voice detection module of the mobile device to listen for a voice command In one embodiment, a method is disclosed. The method can be performed under control of a computing device comprising a processor. The method can include: listening for a shake gesture corresponding to a user shaking the computing device; in responsive to identifying the shake gesture, determining whether a predetermined interaction with the computing device has occurred; and in response to determining that the predetermined interaction with the computing device has occurred, invoking the first application.

The method of the preceding paragraph can further include one or more of the following features: The listening for the shake gesture can include hooking into a gesture application programming interface (API) of a host application. The method can include outputting an invisible overlay over a host application interface. The method can include detecting screen activity via the invisible overlay to determine whether the predetermined interaction with the mobile device has occurred. The predetermined interaction can include one or both of taps and swipes. The method can include determining whether a predetermined interaction with the computing device has occurred by activating a voice detection module of the computing device to listen for a voice command.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 10A-C and 11 depict embodiments of native application interfaces.

Figure 1:
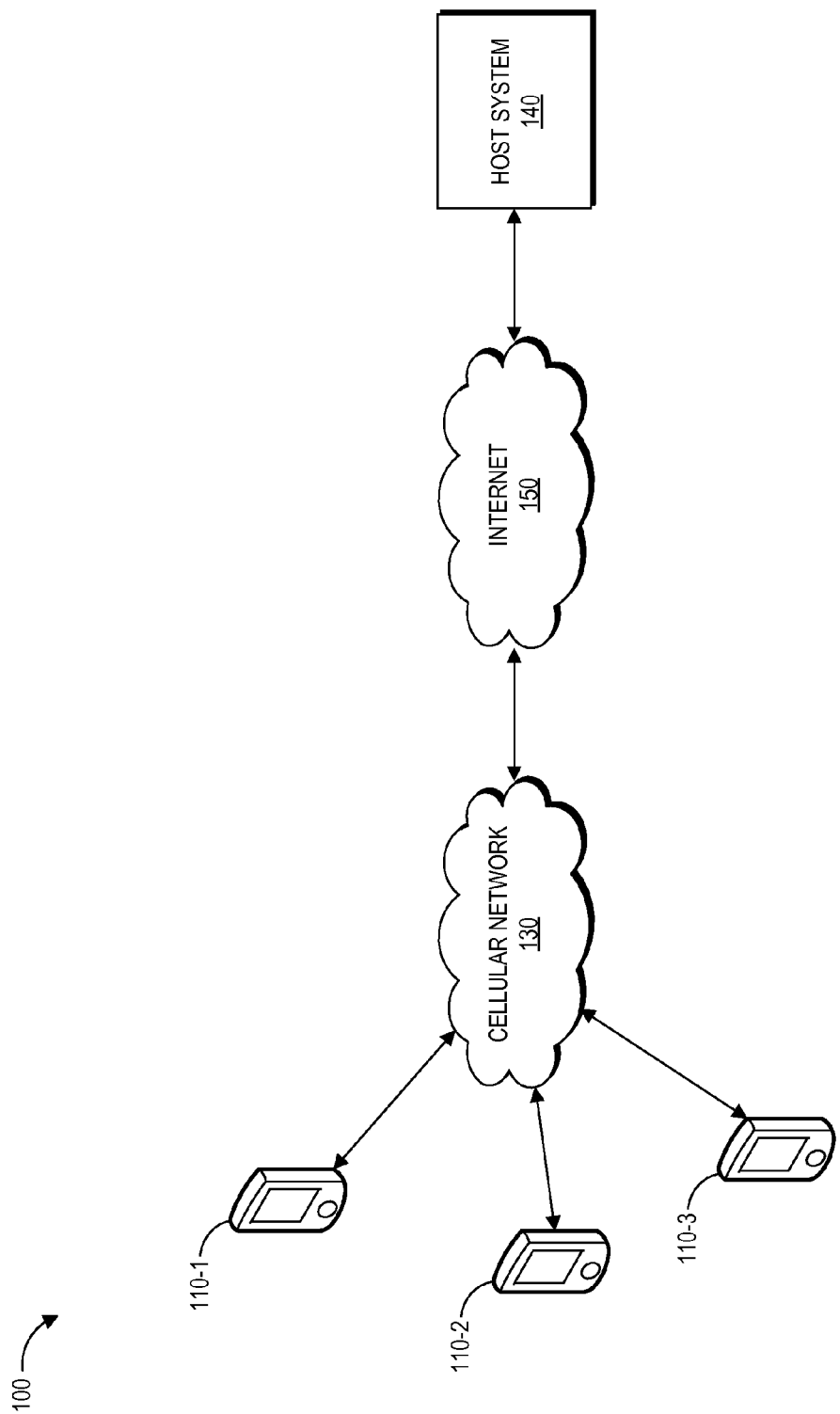
FIG. 1 illustrates an example system on which may be implemented various embodiments of methods in accordance with the disclosure.

Various components of the same type may be distinguished by following the reference label by a dash and a second label that distinguishes among the similar components. If only the first reference label is used herein, the description can be applicable to any one of the similar components having the same first reference label irrespective of the second reference label.

DETAILED DESCRIPTION

I. Tag Management for Native Applications

While tags are commonly used to track user interactions with web sites, digital marketing users may also desire to manage tracking of end user interactions in native applications, including both desktop and mobile applications. For example, a native application can include links, images, or the like that may be viewed or selected by an end user of the native application. In some implementations, a digital marketing user thus can beneficially control the gathering of information about the views or selections by the end user using a tag management system to collect information useful in making business decisions related to the native application or other promoted content. However, since a native application can be a locally installed application and deployed as a precompiled unit of executable code or executable code compiled at run-time, digital marketing users or other marketing users may have difficulty modifying configurations for tracking of user interactions and events that are coded in the native application after the native application has been developed. In addition, some native applications, such as applications for mobile devices, may require advance approval by an organization before updates to the native applications can be released to the end users, thus further slowing the release of modifications to the configuration of the native application.

Digital marketing users and other marketing users additionally may desire to view tag information or manage tags associated with native applications using an easy to access and intuitive interface. One such interface can be a user interface of a native application itself. The user interface of the native application can desirably present tag information or enable management of tags in juxtaposition to, overlaid on, or otherwise together with the end user interface for the digital marketing users and other marketing users. The digital marketing users and other marketing users may thus understand or control information relevant to end user interactions with the native application using a view similar to that of an end user of the native application. However, since the user interface of the native application can be intended for viewing by the end user, the functionality to view tag information and manage the tags may desirably be unobtrusive and hidden from the end user. Hiding this functionality from the end user can be challenging though since usable space or features for hiding the functionality can be limited in some native application environments, such as applications for mobile devices.

This disclosure describes embodiments, systems, methods, and non-transitory computer readable media that can address one or more of the preceding desires or concerns. For example, a native application can be deployed that may obtain some configuration information for the native application at run-time. Digital marketing users or other marketing users can then view or control the behavior of the native application by displaying or setting the configuration information of the native application obtained at run-time. The native application can report tracked end user interactions and events in accordance with the configuration information to tag management systems for data compilation by the tag management systems. Additionally, the native application can enable digital marketing users or other marketing users to view or control the behavior of the native application from within the native application using an integrated configuration utility. The configuration utility can be activated using a two-stage activation process or an activation and authorization process to prevent an end user from accidentally encountering the configuration utility during routine use of the native application. In this way, in some embodiments, the configuration utility can be considered an Easter egg since the two-stage activation process can activate a dormant configuration utility for the native application in response to one or more secret input commands.

As used herein, the term "native application," in addition to having its ordinary meaning, can refer to an application other than a web application or to an application that is not implemented entirely in a web browser. The native application may be a hybrid native/web application in an embodiment.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

II. First Example Native Application Tag Management Systems and Methods

A tag management system (TMS) can enable companies to improve the way they manage the tags (sometimes referred to as pixels) which can be used on their web properties for an increasingly broad range of digital marketing technologies and vendors, ranging from site analytics and affiliate marketing to multivariate testing and retargeting tools. Waiting for IT departments to implement tags may be often a barrier to marketing agility, taking up tech bandwidth which could be more productively used on other areas of website development. Tag implementations are often incomplete and hard to keep track off. As such, digital marketing users want to be more self-sufficient in their management of these tags, so that they can remove the IT bottleneck and impose on tech teams for more value-adding improvements to their web properties.

Tag management systems can enable the placement of a JavaScript snippet on website pages. That code snippet may replace the tags that would otherwise have been individually deployed. For TMS users, coding lines of HTML and JavaScript on pages can be replaced by a web interface where vendors, actions, and pages are unified and controlled.

Further, a tag management solution may offer support for managing the tagging and/or tracking of individual elements of a web page, such as link clicks, image clicks, etc. This can be often provided via a tool which offers a number of convenience features for discovering the elements of the webpage which are desirable for tracking. Such tools may not be a feature of the webpage itself, but rather, an external tool that can be capable of interacting with the webpage. The methods of enabling these tools vary, but may utilize well-understood browser capabilities. One such capability can be a known as a "bookmarklet." A bookmarklet is a web browser bookmark item that can be capable of injecting content into the visible webpage, effectively integrating into the webpage in order to offer the aforementioned features.

The native mobile application environment brings a number of challenges for any third-party vendor desiring a similar level of integration. These challenges can exist in part because the delivery platform may not be a web browser. It is the web browser platform that, in some cases, can allow these aforementioned graceful, on-demand integrations, such as bookmarklets.

Rather, the native mobile application environment may offer no such on-demand integration capabilities. Native applications can be deployed as precompiled units of executable code. It may be within the source code of these applications and at development time (versus on-demand) when these tools can be integrated. The challenge can then become ensuring the desired third-party vendor tool may be accessible to the application's digital marketer or marketing user (who can be managing the configuration of the application) while not accessible to the general user audience, and without the need of source code modification.

Systems and methods in accordance with some embodiments of the disclosure provide a means for a manager of a native mobile application to activate the user interface of a third party tool. This may be done without exposing the capability through a conventional user interface. In the general case, this can be useful since the desired third-party tool may not be intended to be utilized by the general user audience, but rather by the application manager.

In one aspect, an activation process can utilize a combination of phone shake gestures and interactions, such as taps or voice. When the user can execute the proper sequence of shake gestures and interactions, the third-party tool's user interface can be revealed to the user. The sequence required may be complex enough to ensure no accidental activation occurs by a general user. This can be further secured with the use of a server-side mechanism in some implementations.

Attention is now directed to FIG. 1, which illustrates a system 100. System 100 includes one or more portable or mobile devices 110 (also denoted herein for brevity as "devices 110") such as cellular phones, PDAs, Wi-Fi (802.11) devices, or other portable devices. In the system 100, three portable devices 110-1, 110-2 and 110-3 are shown, but the system 100 can include many more portable devices 110. It is further noted that, in some embodiments, the device may not be portable and the functionality herein may be implemented on more stationary devices, such as desktop or notebook computers or other types of fixed devices. In addition, portable devices as described herein may include other types of devices that are mobile but may not be portable.

System 100 further includes a host processing system 140 (also denoted herein as "host system 140") comprising one or more servers as well as other associated computer and data processing hardware (not shown in FIG. 1) such as networking equipment, displays, monitors, I/O devices or other computer or data communication systems, hardware and/or software. In an embodiment, host system 140 may be provided by or operated by an associated host services company or host services supplier.

Figure 3:
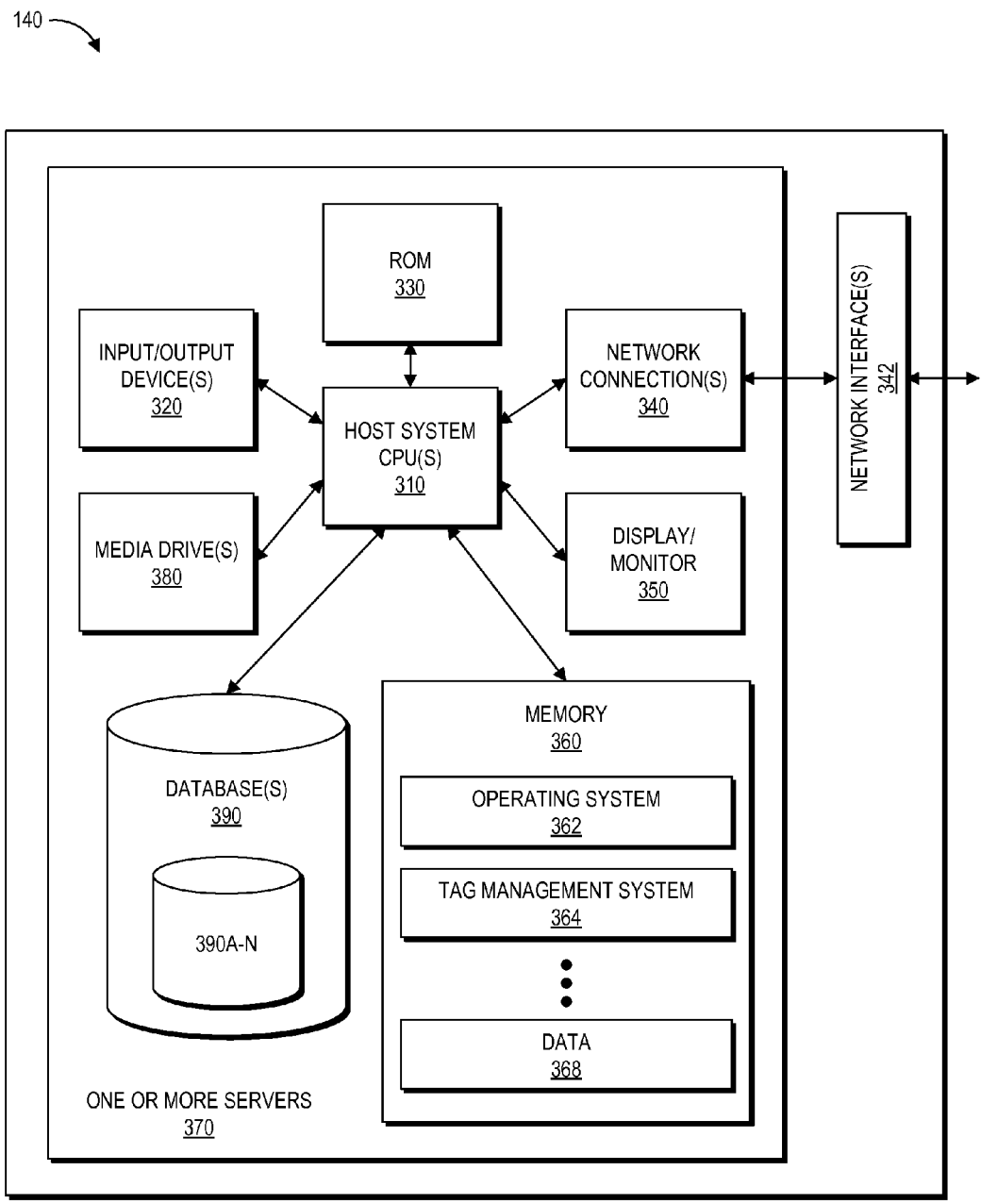
FIG. 3 illustrates a host system configuration on which may be implemented various embodiments of systems and methods in accordance with the disclosure.

As noted previously, host system 140 includes one or more servers 370 that include one or more databases 390 (as shown in FIG. 3) either internal or external to the servers 370. These databases may be used to store advertisements and data such as is further described herein. Host system 140 may also include one or more operating systems 362 associated with the servers, as well as one or more application programs to implement the various host service functionality as is described further herein. Host system 140 may be implemented at a centralized physical location, such as a network connected server farm or other similar facility, and/or may comprise a plurality of distributed servers connected by any of a variety of networking connections at different physical locations.

Devices 110 are typically configured to connect to each other and/or to host system 140 through network 130 as shown in FIG. 1. Network 130 may include wired or wireless networking elements such as Ethernet, LAN technologies, telephony networks, such as POTS phone networks, cellular networks, data networks, or other telephony networks as well as Wi-Fi or Wi-Max networks, other wired or wireless Internet network connections and/or other networks as are known or developed in the art. These connections may be facilitated by one or more client applications 264 (as shown in FIG. 2) running on devices 110 as well as one or more host system applications 364 running on one or more host system servers 370 included in host system 140, along with one more network interfaces 342 and/or other networking hardware and/or software as is known or developed in the art (not shown).

Figure 2:
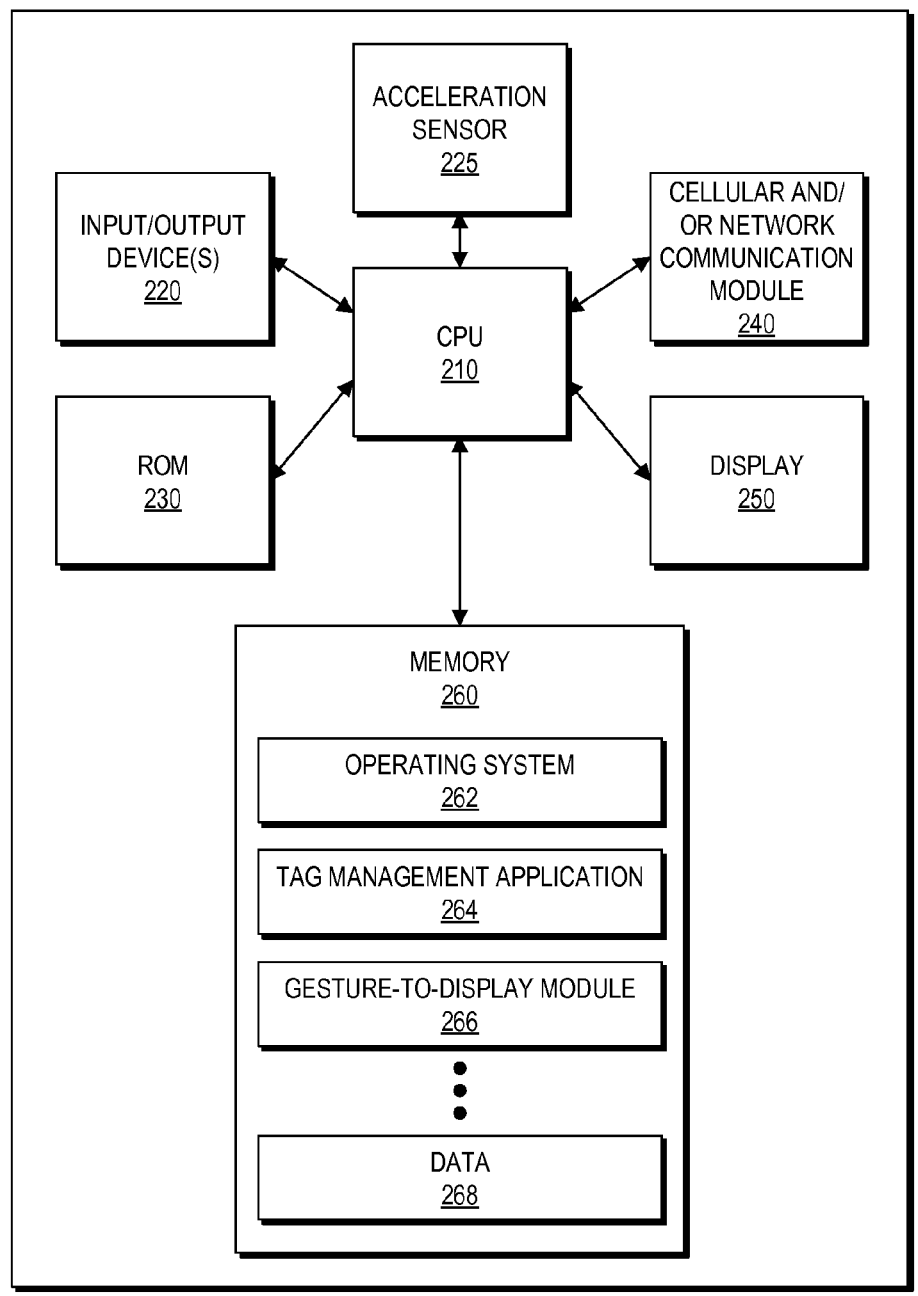
FIG. 2 illustrates a device configuration for a portable device on which may be implemented various embodiments of systems and methods in accordance with the disclosure.

In one aspect, a memory 260 of the device 110 may be provided with a tag management application or applications 264, and a gesture-to-display module 266 as shown in FIG. 2 that may be installed on the user's device 110. The tag management application 264 and gesture-to-display module 266 may be installed on a ROM (read only memory) 230 at a factory, thereby negating the need for the user to download the client 264. Alternately, the user may be supplied with the client application 264 on a computer media such as a CD or DVD, a thumb drive, or via other media known or developed in the art.

FIG. 2 illustrates additional details of an example configuration of a portable device 110 with example device elements that may be used to implement embodiments of the systems and methods in accordance with the disclosure. As shown in FIG. 2, device 110 may include one or more processors (CPUs) 210, which can include one or more specialized or dedicated portable device microprocessors or microcontrollers, an input/output device module 220 configured to allow users to input and output information and interact with applications installed on the device 110, such as the tag management application 264, as well as transfer and receive advertising data, one or more read only memory (ROM) devices 230 or equivalents to provide non-volatile storage of data and/or application or operating system programs, one or more display modules 250, such as an LCD or equivalent display device, as well as one or more memory spaces 260. The device 110 also can include an acceleration sensor 225 that can be activated by a shaking motion in order to activate the tag management application 264 as described herein.

Memory space 260 may comprise DRAM, SRAM, FLASH, hard disk drives or other memory storage devices configured to store and access operating systems 262, the tag management application 264 and/or data 268. Data 268 may include information such as advertisements received from an advertising source system.

FIG. 3 illustrates additional details of one example of a host system 140 with example device elements that may be used to implement embodiments of the present disclosure. As shown in FIG. 3, host system 140 may include one or more processors (CPUs) 310, an input/output device module 320 configured to allow users to input and output information and interact with the host system 140 as well as transfer and receive data, one or more read only memory (ROM) devices 330 or equivalents to provide nonvolatile storage of data and/or programs, one or more display modules 350 such as a computer monitor or other display device, one more network connections 340 and associated network interfaces 342 configured to allow host system 140 to connect to other systems, servers and/or portable devices, including other elements of system 140 in embodiments where the servers or other components are distributed at other physical locations, as well as one or more memory spaces 360 and one or more databases 390. Database(s) 390 may be further divided or distributed as one or more sub-databases 390a-390n, with the sub-databases storing feature or function specific information associated with a particular feature or function. The various components shown in FIG. 3 may be incorporated in one or more physical servers 370 comprising part of host system 140. It is noted that the various components shown in FIG. 3, including database 390, are typically included as part of server(s) 370, however, they may be external to server(s) 370 in some embodiments. For example, in some embodiments database(s) 390 may be external to server(s) 370 and may comprise part of a separate database server system or networked database system.

Memory space 360 may comprise DRAM, SRAM, FLASH, hard disk drives or other memory storage devices, such as media drives 380, configured to store operating systems, application programs and/or data, and memory space 360 may be shared with, distributed with or overlap with the memory storage capacity of database 390. In some embodiments, memory space 360 may include database 390 or in some embodiments database 390 may include data 368 as shown in memory space 360.

Data stored in memory space 360 and/or database 390 may include information, such as tag management system information or other types of data. In particular, memory space 360 may include a host system application or applications 364 stored in the memory space for execution on CPU 310 to perform the various host-side functionality described herein.

Figure 4:
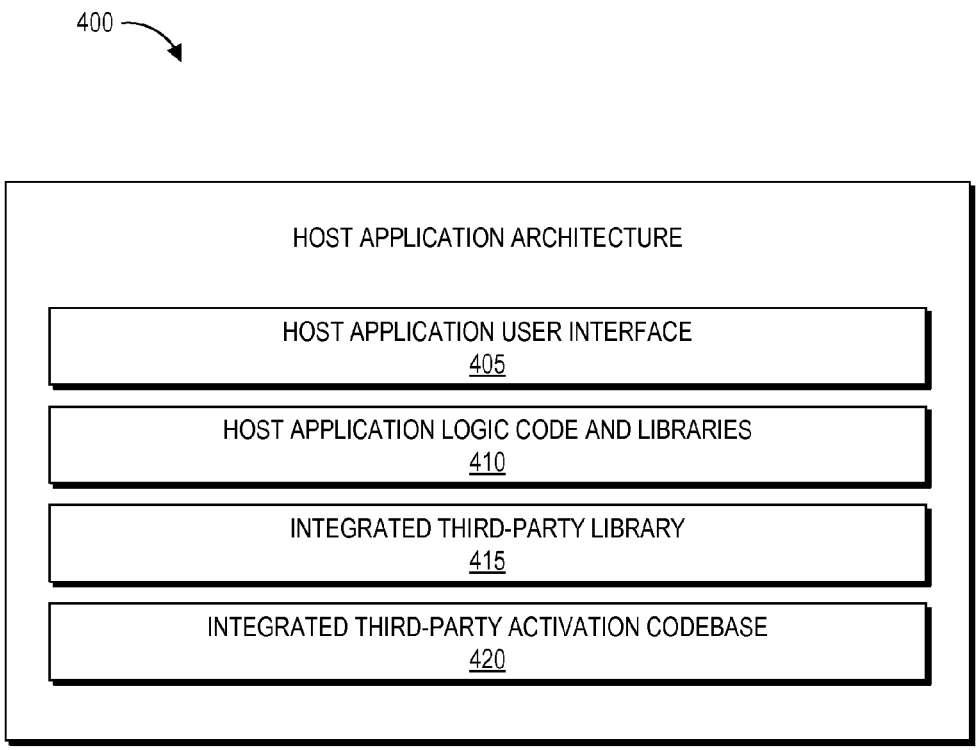
FIG. 4 illustrates an example application architecture for the tag management system in accordance with the disclosure.

In one embodiment, the following assumptions can be made regarding a source code topology 400 illustrated in FIG. 4:

1. There exists a host application developed as a native mobile application that includes a user interface 405 and business logic code and libraries 410 (for example, not a web-page based application);
2. The host application's source code is compiled with the source code of a third-party tool's source code that includes an integrated third party library 415; and
3. This third party tool's source code includes the source code 420 for at least performing the activation functionality described in this disclosure (the gesture-to-configure functionality).

In one embodiment, the third party tool can exist within the host application in order to provide functionality that can be intended to be utilized by the application's developer or manager, not the general user audience. In order to achieve the activation of the tool without exposing the existence of the tool to the general user audience, a gesture-to display code module 266 can be utilized.

The gesture-to-display module 266 can operates as follows:
Upon the host application activating, the sequence required to activate can be determined by the gesture-to-display module 266. This determination may be accomplished through any of the following means, depending on the specific implementation:
a server call can be made to retrieve the activation configuration and sequence requirements, and
via pre-determined, "hardcoded" values;
The gesture-to-display module 266 can then "hook" into the host application's gesture API. This is a standard API provided by most modern smart-phones or other devices. This "hook" can allow the gesture-to-display module 266 to listen for the expected "shake" gestures;
Upon detecting the proper "shake" gesture, the gesture-to-display module 266 can then activate the next step of validation. This step can be used to prevent accidental activations that may otherwise occur if only relying on shake activity. Any of the following can comprise this next activation step:
The gesture-to-display module 266 can place an invisible overlay over the entirety or some portion of the host application's user interface. This overlay can exist to "catch" screen activity, such as taps and swipes. This overlay can exist for a brief amount of time, such as a few seconds, and
A voice detection module of the host device can be activated, allowing to listen for the proper voice command to activate.
If the overlay detects the proper activation input during this step (such as the proper tap sequence, swipe path, or voice command), the gesture-to-display module 266 can then conclude that the intent of the user may be to activate the hidden tool, and displays its user interface to the user.

Appendix A includes a code snippet, for inclusion within an implantation of the gesture-to-display module 266, which can be capable of detecting such sequences of gestures made with respect to devices based upon the Apple™ iOS™ platform. The functionality of this code snippet may be implemented on other platforms as well, including the Google™ Android™ platform, for example.

As noted, some embodiments in accordance with the disclosure may include computer software and/or computer hardware/software combinations configured to implement one or more processes or functions, such as those described herein and/or in the related applications. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of performing functionality described herein, or they may be of the kind well known and available to those having skill in the computer software arts, or they may be a combination of both.

Examples of computer-readable media within the spirit and scope of the present disclosure include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments may be implemented using assembly language, Java, C, C#, C++, or other programming languages and software development tools as are known in the art. Other embodiments of the disclosure may be implemented in hard-wired circuitry in place of, or in combination with, machine-executable software instructions.

III. Second Example Native Application Tag Management Systems and Methods

Figure 5:
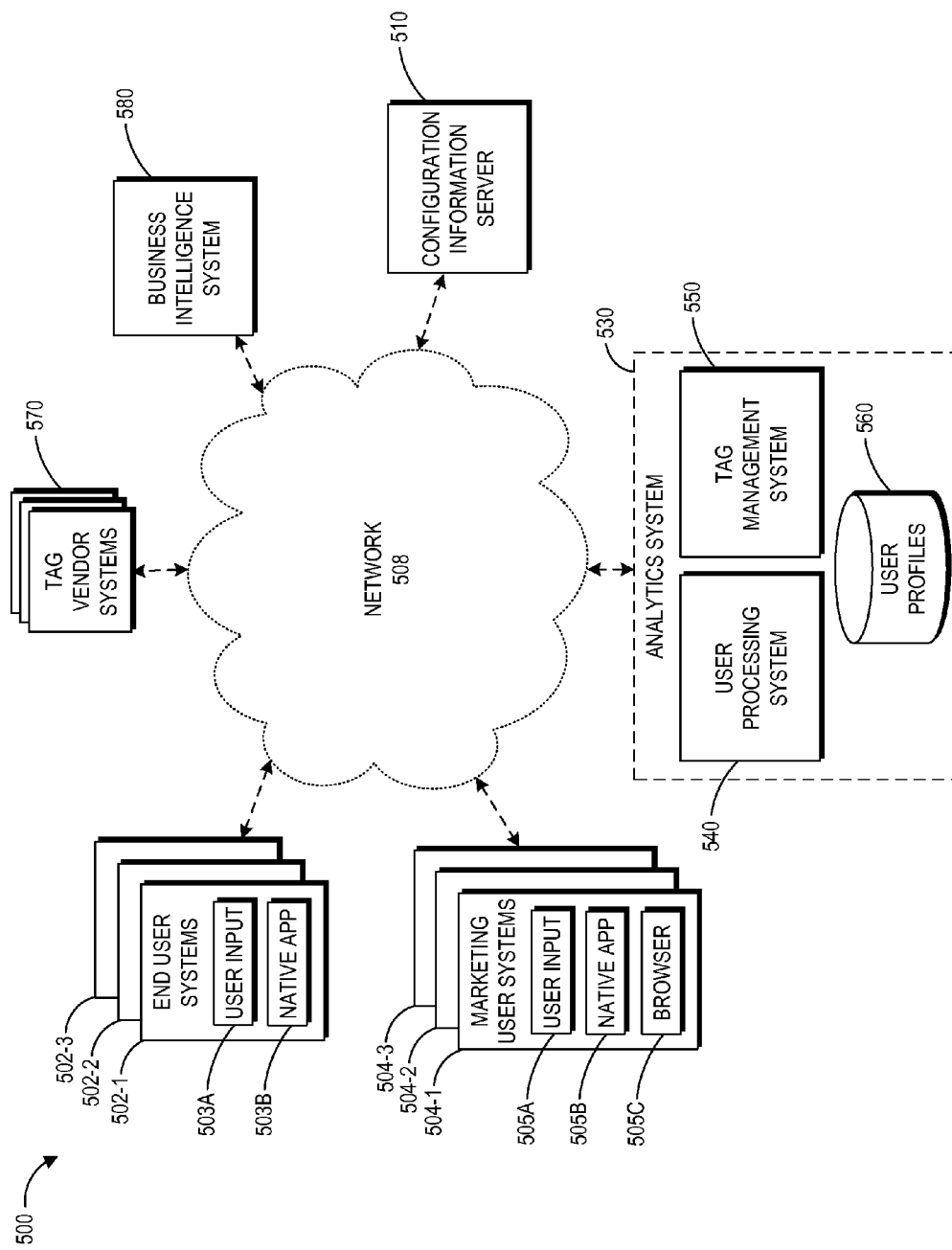
FIG. 5 depicts an embodiment of a computing environment that provides access to an analytics system, a business intelligence system, and tag vendor systems.

The following example or one or more sub-features thereof may be implemented in any combination with any of the features described above. Turning to FIG. 5, an embodiment of a computing environment 500 is shown for implementing various tag features, including some or all of the tag management features described above. In the computing environment 500, one or more end user systems 502, such as end user systems 502-1, 502-2, 502-3, can communicate over a network 508 with a configuration information server 510 and an analytics system 530. The end user system 502 can include any form of computing device and may be a desktop, laptop, smartphone, tablet, a virtualization of a smartphone or tablet, or the like. The end user system 502 can further include a native application 503B, which can provide application content or functionality to the end user system 502, and a user input 503A that can receive user inputs for interacting with the native application 503B. The native application 503B can present a user interface on a display and can request and receive configuration information from the configuration information server 510 for controlling or adjusting operation of the native application 503B. The configuration information can include a directives file, such as a JavaScript file, loadable by the native application 503B. The configuration information server 510 can be a server implemented in computer hardware and/or software and managed by the provider of the native application 503B or the provider of the analytics system 530, for example. Further, the network 108 can include a local area network (LAN), a wide area network (WAN), a company intranet, the public Internet, combinations of the same, or the like.

The analytics system 530 is shown in communication with the configuration information server 510. The analytics system 530 can be implemented in computer hardware and/or software. For instance, the analytics system 530 may be implemented in physical and/or virtual servers, which may be geographically dispersed or co-located. In the depicted embodiment, the analytics system 530 includes the user processing system 540 and the tag management system 550, as well as a user profile data repository 560. The user processing and tag management systems 540, 550 are shown separately for illustrative purposes, although their functionality may be implemented by a single system. The analytics system 530 can also be implemented without the tag management system 550, and thus, the functionality of the user processing system 540 can be implemented independent of any tag management functionality. Further, the analytics system 530 can be implemented without the user processing system 540, and thus, the functionality of the tag management system 550 can be implemented independent of any user processing functionality.

One or more marketing user systems 504, such as marketing user systems 504-1, 504-2, 504-3, can access the configuration information server 510, analytics system 530, or business intelligence system 580 via the network 508. Like the end user system 502, the marketing user system 504 can include a native application 505B, which can provide application content or functionality to the marketing user system 504, and a user input 505A that can receive user inputs for interacting with the native application 505B. The marketing user system 504 can also be any type of computing device including, but not limited to, a desktop, laptop, tablet, smartphone, a virtualization of a smartphone or tablet, or the like. The native application 505B can be a different instance of the same or a similar application as the native application 503B. The user input 505A can include one or more of a motion sensor, touch screen sensor, microphone, button, or the like to receive user inputs. In addition, the marketing user system 504 further can include a browser 505C. The browser 505C or a configuration utility of the native application 505B can be used to access or change the configuration information stored on the configuration information server 510 via the analytics system 530. Although the marketing user system 504 is illustrated as having both the native application 505B and browser 505C, some market user systems 504 may not include the native application or 505B browser 505C, depending on the implementation.

The marketing user system 504 can be operated by marketing users, such as digital marketing professionals, business users, providers of the native application 503B, or any other individual who uses tags or data obtained from tags. Marketing users may not be the primary intended end users of the native applications 503B, 505B in certain embodiments. Instead, a marketing user may use the marketing user system 504 to dynamically view or update the types of data tracked or analyzed for different users of the native application 503B. This data can be tracked by the user processing system 540 via updating the configuration information stored in the configuration information server 510 or updating processing by the user processing system 540 of data obtained from the native application 503B to build updated user profiles 560. In addition, marketing users can access the information stored in the business intelligence system 580 to obtain an understanding of particular end user system 502 for purposes such as evaluating the effectiveness of various marketing campaigns, for instance.

In certain embodiments, the user processing system 540 can enable marketing users to configure the types of data tracked for different users of a native application 503B, as well as analyze and report on this user data. For instance, the user processing system 540 can provide one or more user interfaces via the browser 505C that enable customization of collecting information about user of the native application 503B. Upon execution of the native application 503B, the native application 503B can supply user data to the user the analytics system 530 (optionally through the configuration information server 510). Such user data can be stored in user profiles in the user profile data repository 560, which may include physical computer storage. Marketing users can subsequently query the user profiles to obtain reports or other information about users of the native application 503B.

The tag management system 550 can be used to manage the tags provided by third-party vendors. For instance, the tag management system 150 can provide functionality for marketing users to select which third-party vendor tags to associate with a native application for a variety of vendor-specific processing purposes. These purposes can include obtaining analytics for data analysis or business intelligence, tracking affiliate activity with respect to the native application, obtaining user data for displaying targeted ads, obtaining user data for customizing search functionality or email campaigns targeted to the end users, obtaining user data for personalizing content of the native application, obtaining user data for integration with social networking functionality, obtaining user data for big data analysis, combinations of the same, or the like. Tags for any of these vendor-specific processing purposes, among others, can be considered digital marketing tags. Data collected by the tags from the native application 503B can be provided to tag vendor systems 570, which can perform any of this vendor-specific processing. The data or related data may additionally or alternatively be passed to the tag vendor systems 570 through the tag management system 550.

In an embodiment, the tag management system 550 provides functionality (such as one or more user interfaces through the browser 505B) for marketing users to map data sources in the native application 503B to data sources gathered by the tags. For instance, if a native application includes a shopping cart value named "cart value," the tag management system can provide a user interface that enables a user to tell the tag management system 550 to collect data on the "cart value" and map this data to a "cart_value" variable of one of the tags.

However, in some embodiments, the tags can instead perform a greedy collection of some or all data available in the native application 503B. Since the tags and user processing system 540 can be provided by the same entity, the data obtained by the tags need not be mapped to third-party mappings like the data obtained by the third-party tags. Instead, some or all of the data available to the tags can be provided to the user processing system 540 for processing. Thus, the tags can facilitate vendor-neutral data gathering of some or all of the data elements in the native application 503B. Since this data may not be mapped to a vendor-specific format in certain embodiments, the data can be exported to business intelligence systems, such as business intelligence system 580, without a need to massage the data from its mapped form (which can be cumbersome) to its original, raw form.

The systems 540, 570 can provide the processed data to a business intelligence system 580, which may be owned, operated, or otherwise used by an operator of the native application 503B to analyze application user behavior. The business intelligence system 580 can be implemented in computer hardware and/or software. The business intelligence system 580 can receive the raw data or processed data from the systems 540, 570 and store and manage the data in a way that facilitates a meaningful presentation of information to those interested in the performance of the native application 503B. In some embodiments, the business intelligence system 580 is part of the user processing system 540 or the tag management system 550 rather than separate as illustrated in FIG. 5.

Figure 6:
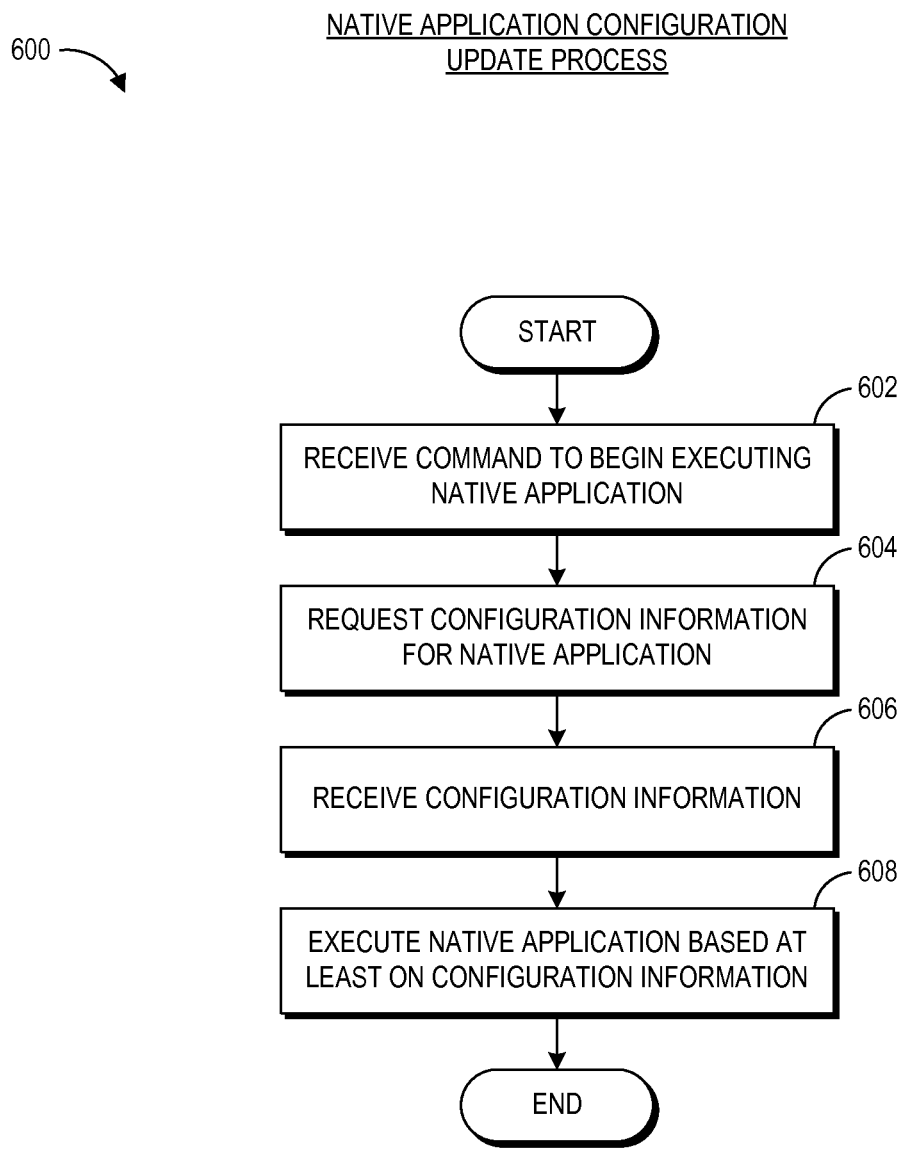
FIG. 6 depicts an embodiment of a native application configuration update process.

Turning to FIG. 6, an embodiment of a native application configuration information update process 600 is shown. The process 600 illustrates an example mode of operation of the computing environment 500 of FIG. 5 and may be implemented by the various components shown in the computing environment 500 of FIG. 5. For convenience, the process 600 is described in the context of the computing environment 500 but may instead be implemented by other systems described herein or other computing systems not shown. The process 600 provides one example approach by which the end user system 502 or marketing user system 504 can obtain updated configuration information for the native application 503B or 505B upon start-up of the native application 503B or 505B. Advantageously, in certain embodiments, the process 600 enables the marketing users to make digital marketing changes to the native application 503B without having to submit an updated version of the native application 503B to an application approval organization or without the end users having to re-download the updated version of the native application 503B.

At block 602, the end user system 502 or marketing user system 504 can receive a command to begin executing the native application 503B or 505B. The command can be received from an end user of the end user system 502 or marketing user of the marketing user system 504 via the user input 503A or 505A. The native application 503B and 505B can include first-party code providing application functionality for the end user of the end user system 502. In addition, the native application 503B and 505B can include integrated third-party code, such as third-party source code and/or a third-party code library. The third-party code can perform functions intended to be hidden from the end user of the end user system 502.

At block 604, the end user system 502 or marketing user system 504 can request configuration information for the native application 503B or 505B from the configuration information server 510 via the network 108. The native application 503B or 505B can cause the end user system 502 or marketing user system 504 to request the configuration information as part of a start-up process for the native application 503B or 505B.

At block 606, the end user system 502 or marketing user system 504 can receive the configuration information for the native application 503B or 505B from the configuration information server 510 via the network 108. The configuration information can include a directives file, such as a JavaScript file, loadable by the native application 503B or 505B as part of start-up process for the native application 503B or 505B or usable as a reference file once the native application 503B or 505B may be running. The configuration information can be stored to a memory of the end user system 502 or a memory of the marketing user system 504, in some implementations. The configuration information can provide information on what to track within the native application 503B or 505B (for example, element identifiers associated with links or events in the native application 503B or 505B), how the information should be tracked, who should be tracked, or the like. In some embodiments, the configuration information can be provided by the provider of the analytics system 530 via the configuration information server 510.

At block 608, the end user system 502 or marketing user system 504 can execute the native application 503B or 505B based at least on the configuration information from the configuration information server 510. In one example, the end user system 502 or marketing user system 504 can activate listeners of the third-party code integrated in the native application 503B or 505B so that the activated listeners process user inputs to the user input 503A or 505A. The activated listeners can include button listeners, scroll listeners, video tracking listeners, or the like, for instance. Executing the native application 503B or 505B can cause the end user system 502 or marketing user system 504 to display an end user interface on a screen of the end user system 502 or marketing user system 504.

Figure 7:
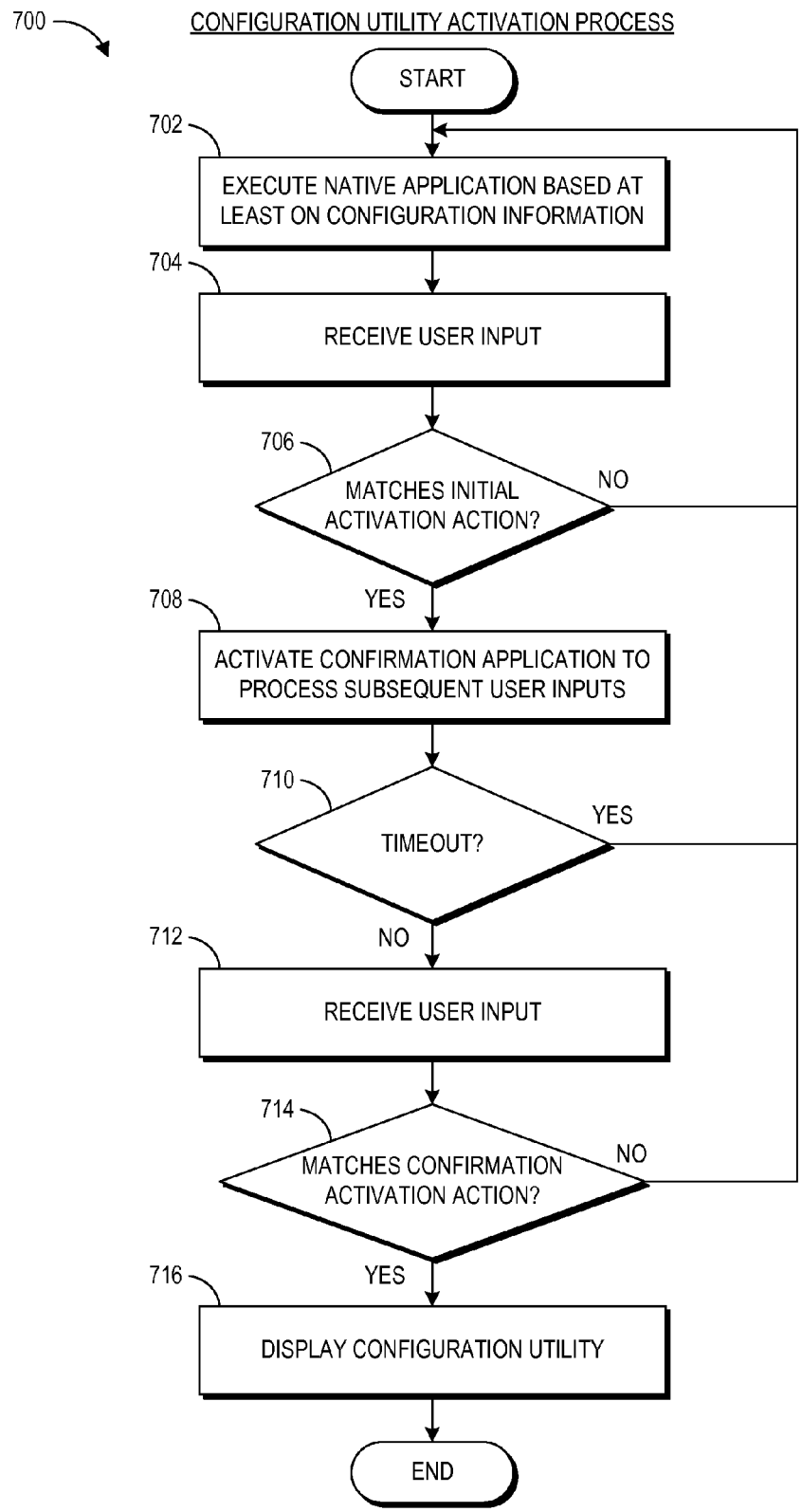
FIG. 7 depicts an embodiment of a configuration utility activation process.

FIG. 7 depicts an embodiment of a configuration utility activation process 700. The process 700 illustrates an example mode of operation of the computing environment 500 of FIG. 5 and may be implemented by the various components shown in the computing environment 500 of FIG. 5. For convenience, the process 700 is described in the context of the computing environment 500 but may instead be implemented by other systems described herein or other computing systems not shown. The process 700 provides one example approach by which the marketing user system 504 can activate a configuration utility as a result of user inputs by a marketing user. Advantageously, in certain embodiments, the process 700 can provide a two-stage activation process to help prevent end users of the end user system 502 from accidentally encountering the configuration utility while operating the native application 503B.

At block 702, the marketing user system 504 can execute the native application 505B based at least on the configuration information from the configuration information server 510. In one example, the marketing user system 504 can activate listeners of the third-party code integrated in the native application 505B so that the activated listeners process user inputs to the user input 505A. The activated listeners can include button listeners, scroll listeners, video tracking listeners, or the like, for instance. Executing the native application 503B or 505B can cause the end user system 502 or marketing user system 504 to display an end user interface on a screen of the end user system 502 or marketing user system 504. In some embodiments, the configuration information can be obtained as described with respect to blocks 602, 604, and 606 of the process 600 of FIG. 6. Additionally or alternatively, the configuration information can be obtained from configuration information loaded onto the marketing user system 504 by the marketing user or from configuration information previously loaded or saved by the native application 505B, for example.

At block 704, the native application 505B can receive a user input via the user input 505A. The user input 505A can receive inputs including one or more or a combination of: a tap on a screen of the marketing user system 504, a pattern drawn on a screen of the marketing user system 504, a shake of the marketing user system 504, a fingerprint detected by a scanner of the marketing user system 504, or a voice input to a microphone of the marketing user system 504.

At block 706, the native application 505B can determine whether the user input received at block 704 matches an initial activation action. For instance, the initial activation action, in one implementation, can be three consecutive shakes of the marketing user system 504. Thus, in this example, if the native application 505B determines that the marketing user system 504 has been shaken three times, the native application 505B can determine that the user input matches the initial activation action. In other implementations, the initial activation action can include one or more or a combination of: a tap on a screen of the marketing user system 504, a pattern drawn on a screen of the marketing user system 504, a shake of the marketing user system 504, a fingerprint detected by a scanner of the marketing user system 504, a voice input to a microphone of the marketing user system 504, or the like. Moreover, the initial activation action can be coded in the native application 505B or determined from the configuration information at run-time, for instance. In some embodiments, the native application 505B or the marketing user system 504 can provide feedback to indicate that the user input matches the initial activation action. The feedback can include one or more or a combination of: a sound output from a speaker of the marketing user system 504, a vibration of the marketing user system 504, a translucent overlay on a screen (for instance, shadowing, coloring, bordering, opaquing, or gridding of one or more elements displayed on the screen) of the marketing user system 504, a dimming or brightening of at least part of a display on a screen of the marketing user system 504, a small icon displayed on a display (for instance, in a corner) on a screen of the marketing user system 504, or the like.

If the native application 505B determines that the user input does not match the initial activation action, the process 700 moves to block 702 and the marketing user system 504 can continue execution of the native application 505B. On the other hand, if the native application 505B determines that the user input matches the initial activation action, the process 700 moves to block 708.

At block 708, the native application 505B can activate a confirmation application to process subsequent user inputs. The confirmation application can be a routine of the native application 505B that remains dormant during normal use by the end user but can activate upon satisfaction of the initial activation action. The confirmation application, for example, can be a part of the third-party code integrated in the native application 505B. In some embodiments, the confirmation application can divert or block some or all user inputs to the user input 505A from being processed by the first-party code of the native application 505B, such as by providing a visible or invisible overlay on the display of the marketing user system 504 to receive all touch inputs to the user input 505A. Moreover, in some embodiments, the native application 505B or the marketing user system 504 can provide feedback to indicate that the confirmation application has been activated. The feedback can include one or more or a combination of: a sound output from a speaker of the marketing user system 504, a vibration of the marketing user system 504, a translucent overlay on a screen (for instance, shadowing, coloring, bordering, opaquing, or gridding of one or more elements displayed on the screen) of the marketing user system 504, a dimming or brightening of at least part of a display on a screen of the marketing user system 504, a small icon displayed on a display (for instance, in a corner) on a screen of the marketing user system 504, or the like.

At block 710, the native application 505B determines whether a timeout period for the confirmation application has expired. The timeout period can be a relatively short duration (for instance, about 5, 10, or 20 seconds or more or less) during which the marketing user of the marketing user system 504 can enter another user input to confirm an intent to activate the configuration utility. If no user inputs are received during the timeout period, the process 700 moves to block 702 and the marketing user system 504 can continue normal execution of the native application 505B. On the other hand, if a user input is received during the timeout period, the process 700 moves to block 712.

At block 712, the confirmation application can receive the user input via the user input 505A. The user input 505A can receive inputs including one or more or a combination of: a tap on a screen of the marketing user system 504, a pattern drawn on a screen of the marketing user system 504, a shake of the marketing user system 504, a fingerprint detected by a scanner of the marketing user system 504, or a voice input to a microphone of the marketing user system 504.

At block 714, the confirmation application can determine whether the user input received at block 712 matches a confirmation activation action. For instance, the confirmation activation action, in one implementation, can be three consecutive taps on a screen of the marketing user system 504. Thus, in this example, if the confirmation application determines that the screen of the marketing user system 504 has been tapped three times, the confirmation application can determine that the user input matches the confirmation activation action. In other implementations, the confirmation activation action can include one or more or a combination of: a tap on a screen of the marketing user system 504, a pattern drawn on a screen of the marketing user system 504, a shake of the marketing user system 504, a voice input to a microphone of the marketing user system 504, or the like. Moreover, the confirmation activation action can be coded in the native application 505B or determined from the configuration information at run-time, for instance. If the confirmation application determines that the user input does not match the confirmation activation action, the process 700 moves to block 702 and the marketing user system 504 can continue execution of the native application 505B. On the other hand, if the confirmation application determines that the user input matches the confirmation activation action, the process 700 moves to block 716.

At block 716, the native application 505B can display the configuration utility. The configuration utility can be a routine of the native application 505B that remains dormant during normal use by the end user but can activate upon satisfaction of the initial and confirmation activation actions. The configuration utility can be used by the marketing user to view the configuration information from the configuration information server 510 in juxtaposition to, overlaid on, or otherwise together with the end user interface of the native application 503B. For example, the configuration utility can be a part of the third-party code integrated in the native application 505B and present the configuration information about what tags are being leveraged at that moment by the first-party code of the native application 505B, what elements of the first-party code user interface can be tagged, or how to identify an element of the first-party application for tagging purposes, or the like. In addition, the configuration utility can be used by the marketing user to change the configuration information stored at the configuration information server 510, such as to enable or remove tracking for one or more elements of the native application 503B. In some embodiments, the configuration utility can provide read-only access to the configuration information since the initial and confirmation activation actions may not be considered sufficient security protections to permit editing of the configuration information stored in the configuration information server 510. In other embodiments, the configuration utility can provide read and write access to the configuration information. Moreover, in some embodiments, at block 716, the native application 505B can additionally or alternatively invoke a particular routine or operation module.

The routine or operation module can include, for example, a function, method, script, or the like.

Figure 8:
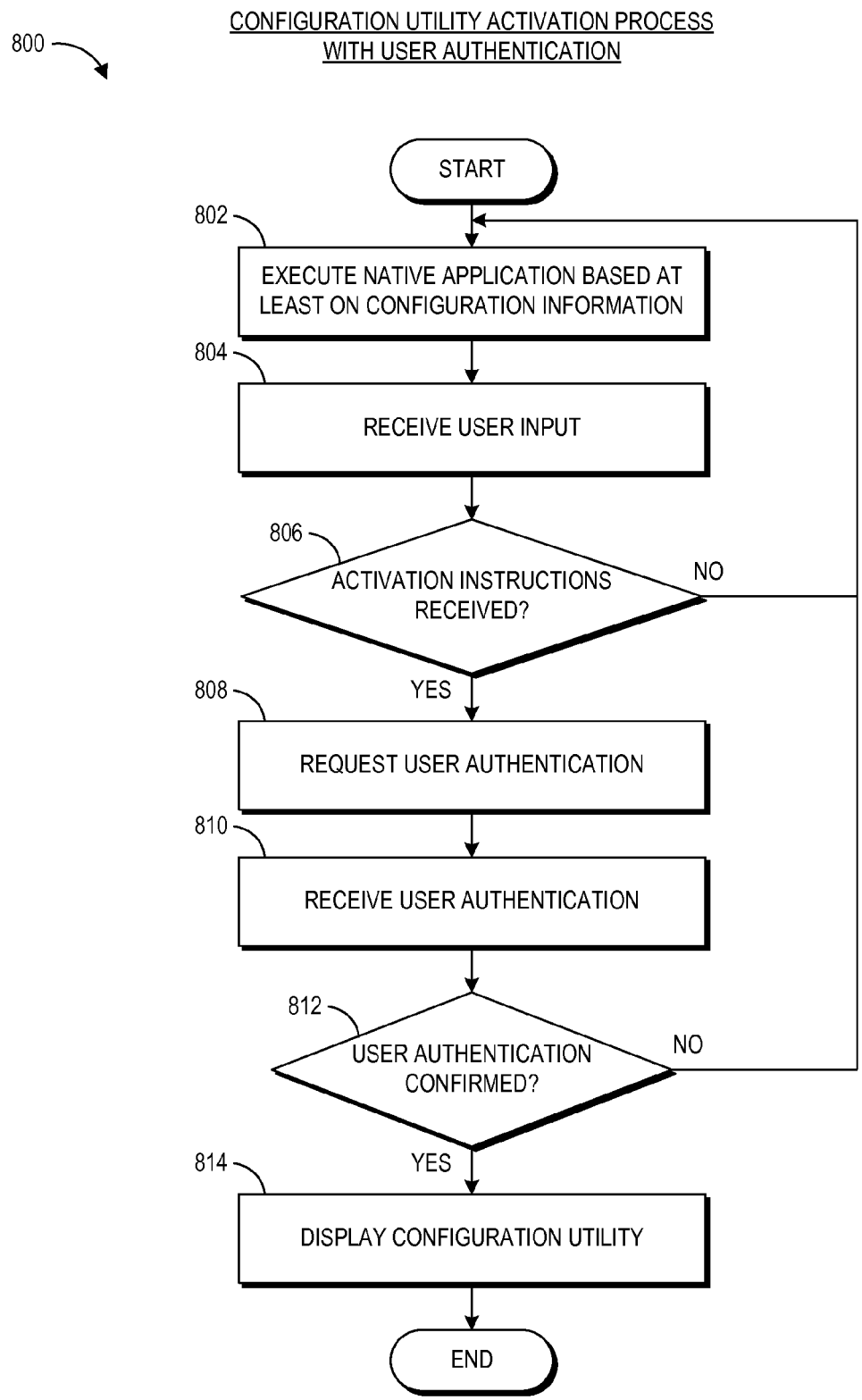
FIG. 8 depicts an embodiment of a configuration utility activation process with user authentication.

FIG. 8 depicts an embodiment of a configuration utility activation process 800 with user authentication. The process 800 illustrates an example mode of operation of the computing environment 500 of FIG. 5 and may be implemented by the various components shown in the computing environment 500 of FIG. 5. For convenience, the process 800 is described in the context of the computing environment 500 but may instead be implemented by other systems described herein or other computing systems not shown. The process 800 provides one example approach by which the marketing user system 504 can activate a configuration utility as a result of a user input and user authentication by the marketing user.

At block 802, the marketing user system 504 can execute the native application 505B based at least on the configuration information from the configuration information server 510. In one example, the marketing user system 504 can activate listeners of the third-party code integrated in the native application 505B so that the activated listeners process user inputs to the user input 505A. The activated listeners can include button listeners, scroll listeners, video tracking listeners, or the like, for instance. Executing the native application 503B or 505B can cause the end user system 502 or marketing user system 504 to display an end user interface on a screen of the end user system 502 or marketing user system 504. In some embodiments, the configuration information can be obtained as described with respect to blocks 602, 604, and 606 of the process 600 of FIG. 6.

At block 804, the native application 505B can receive a user input via the user input 505A. The user input 505A can receive inputs including one or more or a combination of: a tap on a screen of the marketing user system 504, a pattern drawn on a screen of the marketing user system 504, a shake of the marketing user system 504, a fingerprint detected by a scanner of the marketing user system 504, or a voice input to a microphone of the marketing user system 504.

At block 806, the native application 505B can determine whether the user input received at block 804 matches activation instructions. For instance, the activation instructions in one implementation can be three consecutive shakes of the marketing user system 504. Thus, in this example, if the native application 505B determines that the marketing user system 504 has been shaken three times, the native application 505B can determine that the activation instructions have been received. In other implementations, the activation instructions can be determined to be received in response to sensing one or more or a combination of: a tap on a screen of the marketing user system 504, a pattern drawn on a screen of the marketing user system 504, a shake of the marketing user system 504, a voice input to a microphone of the marketing user system 504, or the like. Moreover, the activation instructions can be coded in the native application 505B or determined from the configuration information at run-time, for instance. In some embodiments, the native application 505B or the marketing user system 504 can provide feedback to indicate that the user input matches the activation instructions. The feedback can include one or more or a combination of: a sound output from a speaker of the marketing user system 504, a vibration of the marketing user system 504, a translucent overlay on a screen (for instance, shadowing, coloring, bordering, opaquing, or gridding of one or more elements displayed on the screen) of the marketing user system 504, a dimming or brightening of at least part of a display on a screen of the marketing user system 504, a small icon displayed on a display (for instance, in a corner) on a screen of the marketing user system 504, or the like.

If the native application 505B determines that the activation instructions have not been received, the process 800 moves to block 802 and the marketing user system 504 can continue execution of the native application 505B. On the other hand, if the native application 505B determines that the activation instructions have been received, the process 800 moves to block 808.

At block 808, the native application 505B can request a user authentication from the marketing user. The native application 505B can request that the marketing user, for example, provide a username, a password, a fingerprint, or the like via the user input 505A. At block 810, the native application 505B can receive the user authentication from the user input 505A. At block 812, the native application 505B can determine whether the user authentication is confirmed to match the authentication for a marketing user of the native application 505B. If the user authentication is not confirmed to match the authentication for a marketing user of the native application 505B, the process 800 moves to block 802 and the marketing user system 504 can continue execution of the native application 505B. On the other hand, if the user authentication is confirmed to match the authentication for a marketing user of the native application 505B, the process 800 moves to block 814.

At block 814, the native application 505B can display the configuration utility. The configuration utility can be a routine of the native application 505B that remains dormant during normal use by the end user but can activate upon satisfaction of the initial and confirmation activation actions. The configuration utility can be used by the marketing user to view the configuration information from the configuration information server 510 in juxtaposition to, overlaid on, or otherwise together with the end user interface of the native application 503B. For example, the configuration utility can be a part of the third-party code integrated in the native application 505B and present the configuration information about what tags are being leveraged at that moment by the first-party code of the native application 505B, what elements of the first-party code user interface can be tagged, or how to identify an element of the first-party application for tagging purposes, or the like. In addition, the configuration utility can be used by the marketing user to change the configuration information stored at the configuration information server 510, such as to enable or remove tracking for an element of the native application 503B. In some embodiments, the configuration utility can automatically provide read and write access to the configuration information since the marketing user has provided both the activation instructions and a confirmed user authentication, which may be considered sufficient security protections to permit editing of the configuration information stored in the configuration information server 510. Moreover, in some embodiments, at block 814, the native application 505B can additionally or alternatively invoke a particular routine or operation module. The routine or operation module can include, for example, a function, method, script, or the like.

Figure 9:
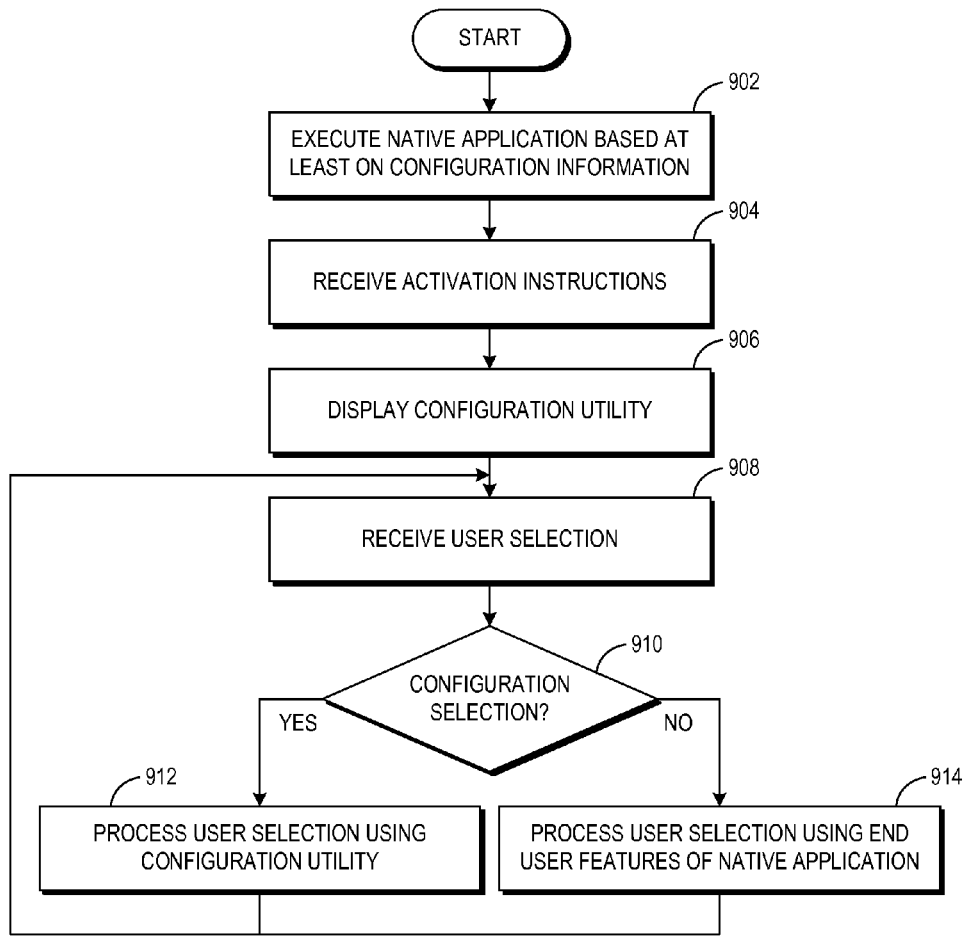
FIG. 9 depicts an embodiment of a configuration utility operation process.

FIG. 9 depicts an embodiment of a configuration utility operation process 900. The process 900 illustrates an example mode of operation of the computing environment 500 of FIG. 5 and may be implemented by the various components shown in the computing environment 500 of FIG. 5. For convenience, the process 900 is described in the context of the computing environment 500 but may instead be implemented by other systems described herein or other computing systems not shown. The process 900 provides one example approach by which the marketing user system 504 can operate the configuration utility in juxtaposition to the end user interface of the native application 505B. Advantageously, in certain embodiments, the process 900 also can alter the end user facing features of the native application 505B so that the marketing user can access or change the configuration information while selectively enabling and viewing the end user facing features.

At block 902, the marketing user system 504 can execute the native application 505B based at least on the configuration information from the configuration information server 510. In one example, the marketing user system 504 can activate listeners of the third-party code integrated in the native application 505B so that the activated listeners process user inputs to the user input 505A. The activated listeners can include button listeners, scroll listeners, video tracking listeners, or the like, for instance. Executing the native application 503B or 505B can cause the end user system 502 or marketing user system 504 to display an end user interface on a screen of the end user system 502 or marketing user system 504. In some embodiments, the configuration information can be obtained as described with respect to blocks 602, 604, and 606 of the process 600 of FIG. 6.

At block 904, the native application 505B can receive activation instructions from the marketing user of the marketing user system 504. For instance, the activation instructions in one implementation can be three consecutive shakes of the marketing user system 504. Thus, in this example, if the native application 505B determines that the marketing user system 504 has been shaken three times, the native application 505B can determine that the activation instructions have been received. In other implementations, the activation instructions can be determined to be received in response to sensing one or more or a combination of: a tap on a screen of the marketing user system 504, a pattern drawn on a screen of the marketing user system 504, a shake of the marketing user system 504, a fingerprint detected by a scanner of the marketing user system 504, a voice input to a microphone of the marketing user system 504, or the like. Moreover, the activation instructions can be coded in the native application 505B or determined from the configuration information at runtime, for instance.

At block 906, the native application 505B can display the configuration utility. The configuration utility can be a routine of the native application 505B that remains dormant during normal use by the end user but can activate upon satisfaction of the initial and confirmation activation actions. The configuration utility can be displayed as a highlighting of one or more elements displayed on the end user interface, a logo indicative of activation of the configuration utility, a configuration display menu providing the configuration information from the configuration information server 510, or the like. The configuration utility can be a part of the third-party code integrated in the native application 505B. Advantageously, in certain embodiments, the configuration utility can present the configuration information about what tags are being leveraged at that moment by the first-party code of the native application 505B, what elements of the first-party code user interface can be tagged, or how to identify an element of the first-party application for tagging purposes, or the like. In addition, the configuration utility can be used by the marketing user to change the configuration information stored at the configuration information server 510, such as to enable or remove tracking for an element of the native application 503B.

At block 908, the configuration utility can receive a user selection via the user input 505A. The user input 505A can receive inputs including one or more or a combination of: a tap on a screen of the marketing user system 504, a pattern drawn on a screen of the marketing user system 504, a shake of the marketing user system 504, a fingerprint detected by a scanner of the marketing user system 504, or a voice input to a microphone of the marketing user system 504.

At block 910, the configuration utility can determine whether the user selection received at block 908 is a configuration selection. For example, in one implementation, when the user selection includes double-tapping on the screen over of a displayed element, the user selection can be considered a configuration selection. In other implementations, the user selection can be considered a configuration selection in response to selection of menu displays of the configuration utility or one or more or a combination of: a tap on a screen of the marketing user system 504, a pattern drawn on a screen of the marketing user system 504, a shake of the marketing user system 504, a fingerprint detected by a scanner of the marketing user system 504, a voice input to a microphone of the marketing user system 504, or the like.

If the user selection is determined not to be a configuration selection, the process 900 moves to block 914 and the user selection can be processed using the end user features of the native application 505B. For example, if the user selection designated an element (such as a link or button) of the end user interface of the native application 505B, the first-party code of the native application 505B can process the selection as if an end user selected the element of the end user interface. The process 900 can then move to block 908 and await a further user selection. On the other hand, if the user selection is determined to be a configuration selection, the process moves to block 912.

At block 912, the user selection can be processed using the configuration utility. For example, if the user selection designated an element (such as a link or button) of the end user interface of the native application 505B, the configuration utility can display the configuration information, such as an element identifier, associated with the selected element in a configuration display menu. In another example, if the user selection designated an item in a configuration display menu of the configuration utility, the configuration utility can accept selection of the item and perform the function associated with the designated menu item.

FIGS. 10A-C and 11 depict embodiments of native application interfaces 1000A-C and 1100. The interfaces 1000A-C and 1100 can be displayed by the native application 505B or by a separate application on a display of the marketing user system 504, for example. The data included in the interface 1000A-C and 1100 may be supplied by the native application 505B, the configuration information from the configuration information server 510, the analytics system 530, the tag vendor systems 570, or the business intelligence system 580. In some embodiments, the native application 505B and the configuration information alone supply the data shown in the interfaces 1000A-C and 1100. The interfaces 1000A-C and 1100 can advantageously, in certain embodiments, display a configuration utility in juxtaposition to, overlaid on, or otherwise together with the end user interface of the native application 505B for the marketing user of the marketing user system 504.

Figure 10B:
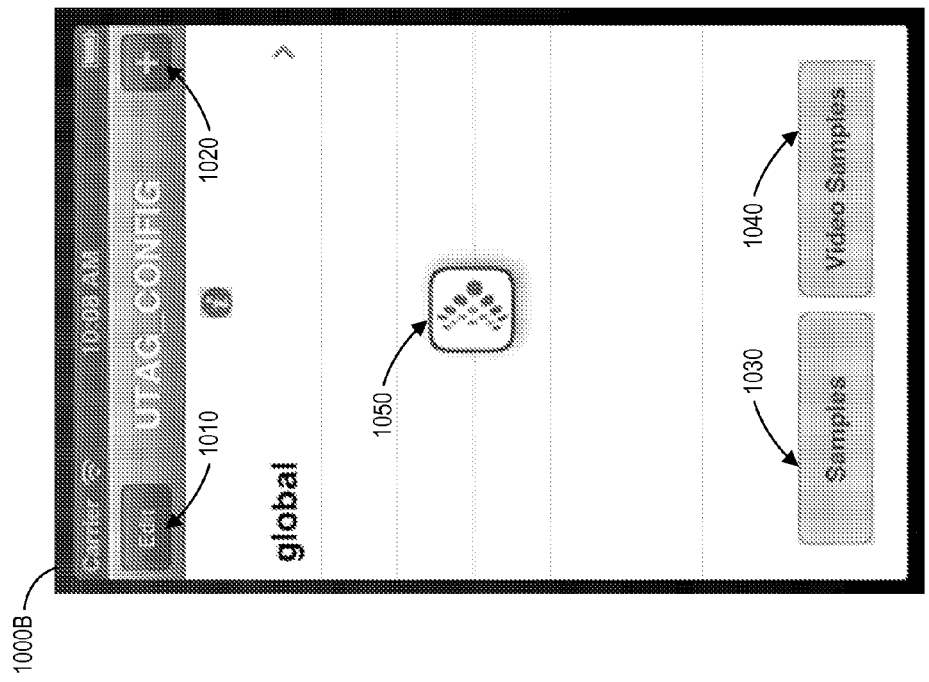
Figure 10A:
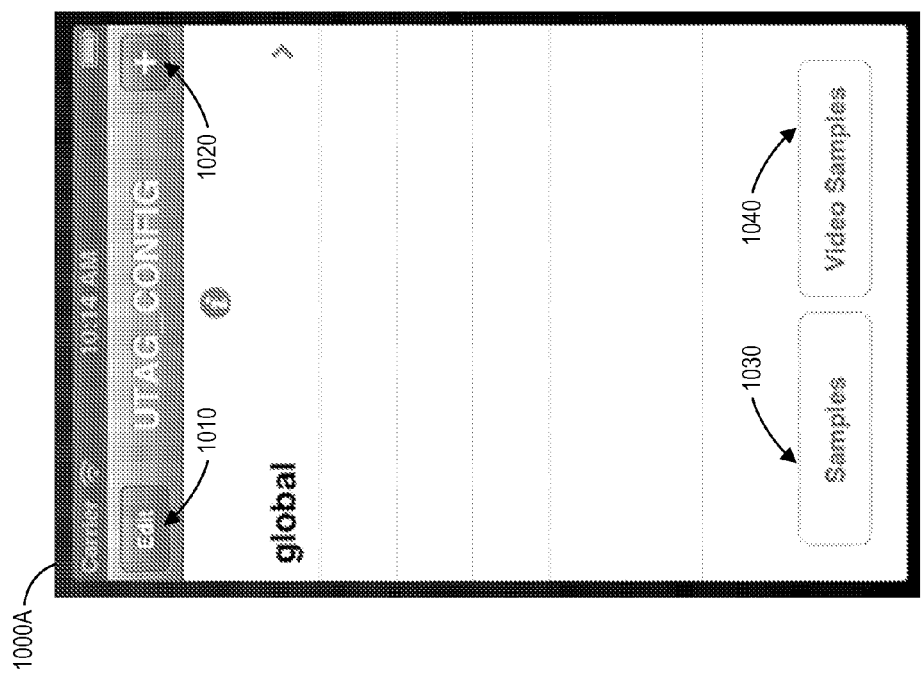

FIG. 10A depicts an example interface 1000A of a native application as viewed by an end user of the native application. The interface 1000A includes four buttons, an edit button 1010, an add button 1020, an samples button 1030, and an video samples button 1040. At this time, a marketing user of the interface 1000A can choose to activate the configuration utility as described with respect to the processes 700 or 800, for example.

FIG. 10B depicts an example interface 1000B of the native application of the interface 1000A once the marketing user has activated the configuration utility. The configuration utility is displayed in the interface 1000B as a highlighting of the four buttons included in the interface 1000A, as well as a logo 1050 indicative of activation of the configuration utility near the center of the interface 1000B. The marketing user can select the one of the four buttons 1010, 1020, 1030, 1040 or the logo 1050 to view the configuration information associated with the selected button or logo as described with respect to the process 900, for example. In some embodiments, the highlighting of the four buttons can indicate that the four buttons may be tracked by the native application.

Figure 10C:
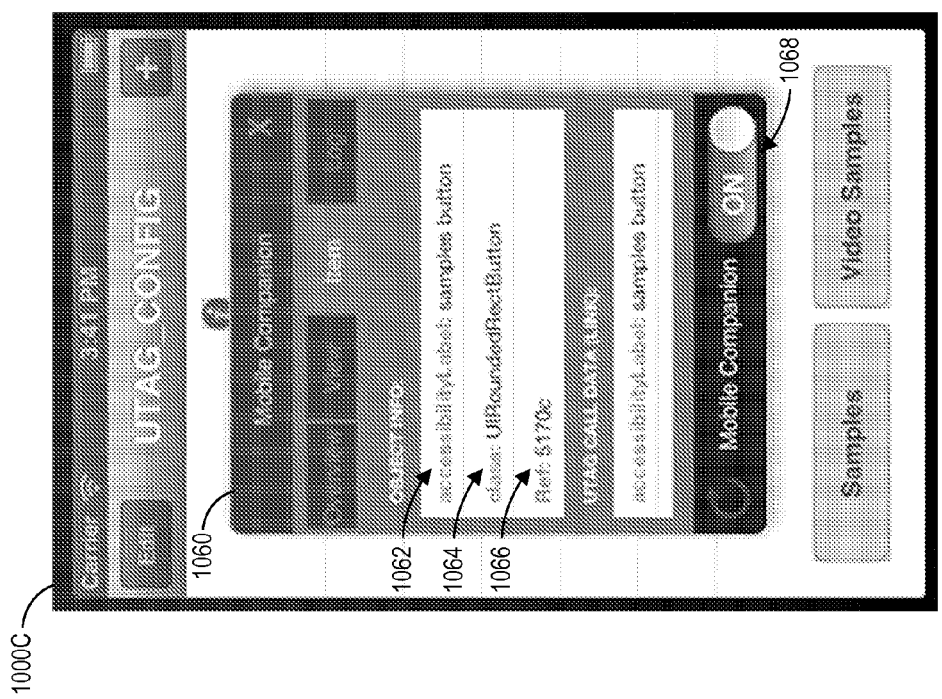

FIG. 10C depicts an example interface 1000C of the native application of the interface 1000B once the marketing user has selected the samples button 1030. As can be seen, the selection of the samples button 1030 has triggered a configuration display menu 1060 to appear that presents the configuration information associated with the samples button 1030. In the illustrated example, the properties for the samples button 1030 are: accessibilityLabel 1062="samples button", class 1064="UIRoundedRectButton", and Ref 1066="5170c". In addition, the highlighting of the samples button 1030 can cycle on and off to indicate that the samples button has been selected. Advantageously, in certain embodiments, the marketing user can use the value of the accessibilityLabel or Ref for the samples button 1030 as an element identifier to change a tracking setting for tracking use of the samples button 1030 by end users of the native application. The configuration display menu 1060 further can be minimized by selecting the switch 1068.

Figure 11:
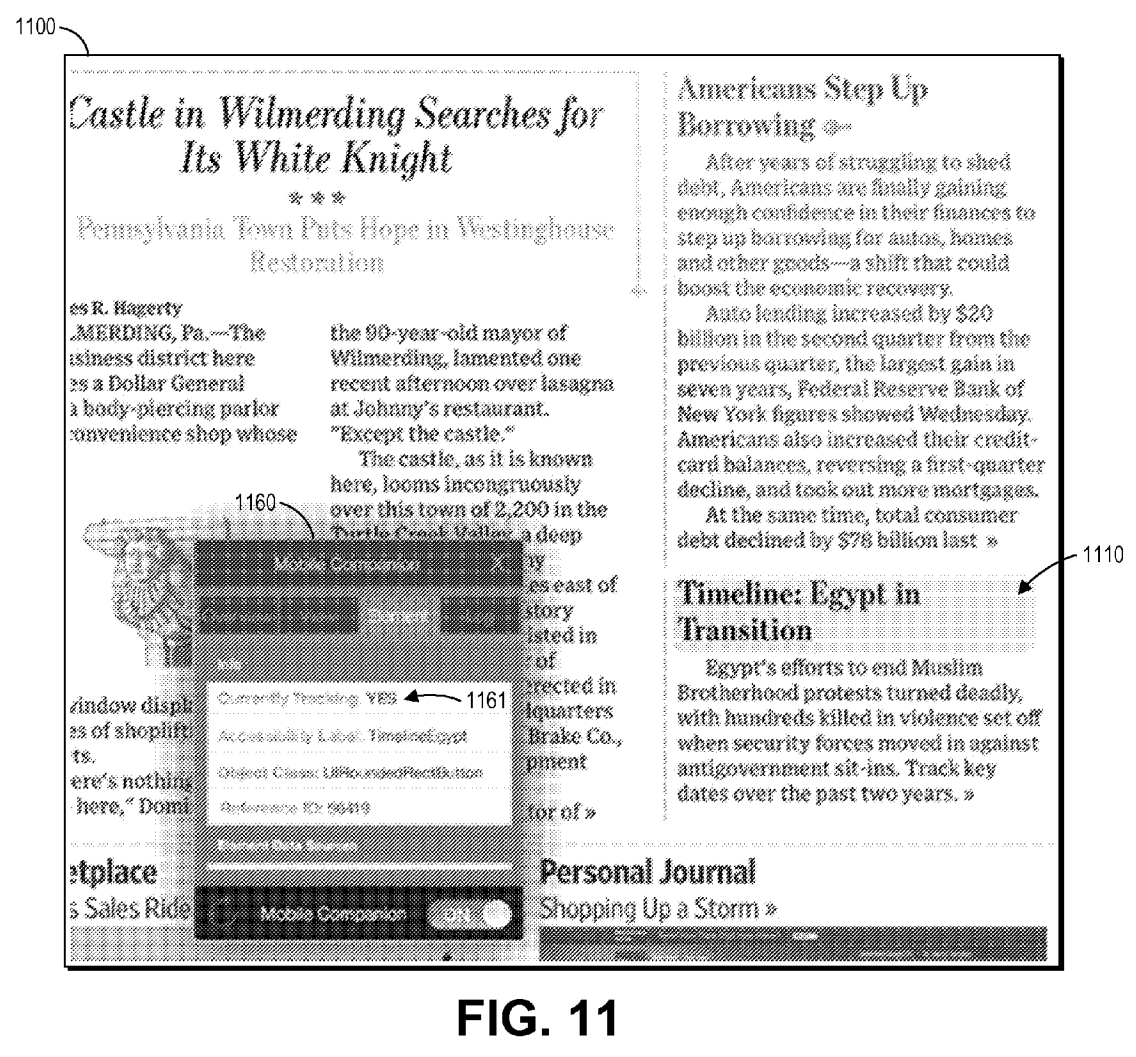

FIG. 11 depicts an example interface 1100 of a native application once the configuration display menu 1160 for native application has been activated. As can be seen by the highlighted text "Timeline: Egypt in Transition", the element for the highlighted text "Timeline: Egypt in Transition" has been selected by a marketing user and the configuration information associated with the element is being displayed in the configuration display menu 1160. The configuration display menu 1160 can be similar to the configuration display menu 1060 of FIG. 10; however, the configuration display menu 1160 notably also presents the current tracking status 1161 for the element for the highlighted text "Timeline: Egypt in Transition". As illustrated, the property for the element is Currently Tracking="YES" indicating that use of the element is currently being tracked by the native application.

The user interface controls shown in FIGS. 10A-C and 11 are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, the user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

IV. Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Although some embodiments of the disclosure have been illustrated using tag management systems and associated devices and systems as examples, the disclosure can further apply to other application environments. In one example, the disclosure can apply to native application environments where a digital marketing user or native application provider can desire to flexibly change the way a native application behaves after deployment, such as by changing colors, background images, text, or the like of the native application. In another example, the disclosure can apply to native application environments where a digital marketing user or native application provider may desire to use the native application itself as a medium for viewing or changing configurations for the native application for end users of the native application. In a further example, the disclosure can apply to native application environments where a digital marketing user or native application provider can desire to display or alter information related to third-party code embedded in a first-party native application or third-party configurations associated with the first-party native application. In yet another example, the disclosure can apply to native application environments where a digital marketing user or native application provider can desire to activate third-party features embedded in a first-party native application where the third-party features are intended for use by the digital marketing user or native application provider and not for use by the end user of the first-party native application.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of executing and accessing a configuration utility via an end user view of a host mobile application, the method comprising:
   under control of a physical computing device comprising digital logic circuitry:
   executing a host mobile application configured to invoke a configuration utility;
   displaying an end user interface of the host mobile application on a screen of the physical computing device to a user of the physical computing device;

receiving a first user input from the user indicative of selection of an element of the end user interface;

performing an end user functionality of the host mobile application corresponding to the element of the end user interface in response to receiving the first user input;

while displaying the end user interface, receiving a second user input from the user, wherein an existence of a capability for the user to input the second user input to trigger display of a configuration utility interface of the configuration utility on the screen is provided without the existence of the capability being exposed to the user in a visually perceptible way by the end user interface; and displaying the configuration utility interface on the screen to the user together with the end user interface in response to receiving the second user input, the configuration utility interface comprising configuration information for the end user interface.

2. The method of claim 1, wherein the physical computing device comprises a mobile phone.

3. The method of claim 1, wherein the second user input comprises a two-stage activation sequence including two or more of: a user tap on the screen, a user shake of the physical computing device, and a user voice input.

4. The method of claim 3, wherein the two-stage activation sequence is configured to prevent end users of the host mobile application from accidently encountering the configuration utility interface.

5. The method of claim 1, further comprising:
under control of the physical computing device comprising the digital logic circuitry:
receiving a third user input from the user indicative of selection of the element of the end user interface;
in response to determining that the third user input is a configuration selection input, performing an administrator functionality of the configuration utility corresponding to the element of the end user interface; and
in response to determining that the third user input is not the configuration selection input, performing the end user functionality of the host mobile application corresponding to the element of the end user interface.

6. The method of claim 5, wherein said performing the administrator functionality comprises displaying the configuration information associated with the element in the configuration utility interface.

7. The method of claim 1, wherein the host mobile application and the configuration utility are part of the same pre-compiled unit of executable code, and the end user interface is displayed according to first-party developed computer-executable code and the configuration utility interface is displayed according to third-party developed computer-executable code.

8. The method of claim 1, further comprising:
under control of the physical computing device comprising the digital logic circuitry:
changing the configuration information based at least on a third user input when the user is an authenticated user.

9. The method of claim 1, wherein said executing the host mobile application comprises executing the host mobile application based at least on the configuration information obtained by the host mobile application from a server at run-time of the host mobile application.

10. The method of claim 1, wherein said displaying the configuration utility interface comprises displaying the configuration utility interface overlaid on the end user interface.

11. A system for executing and accessing a configuration utility via an end user view of a host mobile application, the system comprising:
a memory configured to store a host mobile application that invokes a configuration utility; and
a physical computing device comprising a hardware processor in communication with the memory, the hardware processor configured to:
execute the host mobile application;
display an end user interface of the host mobile application on a screen of the physical computing device to a user of the physical computing device;
receive a first user input from the user indicative of selection of an element of the end user interface;
perform an end user functionality of the host mobile application corresponding to the element of the end user interface in response to receiving the first user input;
while displaying the end user interface, receive a second user input from the user, wherein an existence of a capability for the user to input the second user input to trigger display of a configuration utility interface of the configuration utility on the screen is provided without the existence of the capability being exposed to the user in a visually perceptible way by the end user interface; and
display the configuration utility interface on the screen to the user together with the end user interface in response to receiving the second user input, the configuration utility interface comprising configuration information for the end user interface.

12. The system of claim 11, wherein the physical computing device comprises a mobile phone.

13. The system of claim 11, wherein the second user input comprises a two-stage activation sequence including two or more of: a user tap on the screen, a user shake of the physical computing device, and a user voice input.

14. The system of claim 11, wherein the hardware processor is configured to:
receive a third user input from the user indicative of selection of the element of the end user interface;
in response to determining that the third user input is a configuration selection input, perform an administrator functionality of the configuration utility corresponding to the element of the end user interface; and
in response to determining that the third user input is an end user selection input, perform the end user functionality of the host mobile application corresponding to the element of the end user interface.

15. The system of claim 11, wherein the second user input denotes that the user is an administrator of the host mobile application rather than an end user of the host mobile application.

16. Non-transitory physical computer storage comprising computer-executable instructions stored thereon that, when executed by one or more processors, are configured to implement a process comprising:
invoking a configuration utility with a host mobile application being executed by a physical computing device;
displaying an end user interface of the host mobile application on a screen of the physical computing device to a user of the physical computing device;
receiving a first user input from the user indicative of selection of an element of the end user interface;

performing an end user functionality of the host mobile application corresponding to the element of the end user interface in response to receiving the first user input;

while displaying the end user interface, receiving a second user input from the user, wherein an existence of a capability for the user to input the second user input to trigger display of a configuration utility interface of the configuration utility on the screen is provided without the existence of the capability being exposed to the user in a visually perceptible way by the end user interface; and displaying the configuration utility interface on the screen to the user together with the end user interface in response to receiving the second user input, the configuration utility interface comprising configuration information for the end user interface.

17. The non-transitory physical computer storage of claim 16, wherein the physical computing device comprises a mobile phone.

18. The non-transitory physical computer storage of claim 16, wherein the second user input comprises a two-stage activation sequence including two or more of: a user tap on the screen, a user shake of the physical computing device, and a user voice input.

19. The non-transitory physical computer storage of claim 16, wherein the process further comprises:

receiving a third user input from the user indicative of selection of the element of the end user interface;

in response to determining that the third user input is a configuration selection input, performing an administrator functionality of the configuration utility corresponding to the element of the end user interface; and in response to determining that the third user input is not the configuration selection input, performing the end user functionality of the host mobile application corresponding to the element of the end user interface.

20. The non-transitory physical computer storage of claim 19, wherein said performing the administrator functionality comprises displaying the configuration information associated with the element in the configuration utility interface.

* * * * *